(12) United States Patent
Vagelos

(10) Patent No.: US 12,250,555 B2
(45) Date of Patent: Mar. 11, 2025

(54) SYSTEM AND PROCESS IMPLEMENTING A SECURE NETWORK

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 78 days.

(21) Appl. No.: 17/879,065

(22) Filed: Aug. 2, 2022

(65) Prior Publication Data

US 2023/0013356 A1   Jan. 19, 2023

Related U.S. Application Data

(60) Provisional application No. 63/223,272, filed on Jul. 19, 2021.

(51) Int. Cl.
*H04W 12/71* (2021.01)
*H04W 12/037* (2021.01)
*H04W 12/088* (2021.01)

(52) U.S. Cl.
CPC ......... *H04W 12/71* (2021.01); *H04W 12/037* (2021.01); *H04W 12/088* (2021.01)

(58) Field of Classification Search
CPC . H04W 12/71; H04W 12/037; H04W 12/088; H04L 63/0272; H04L 63/101
See application file for complete search history.

(56) References Cited

U.S. PATENT DOCUMENTS

| 2014/0325588 A1* | 10/2014 | Jalan ................... H04L 63/1466 726/1 |
| 2017/0178193 A1* | 6/2017 | Jagannath .............. G06Q 30/04 |
| 2023/0171593 A1* | 6/2023 | Neuhaeuser .......... H04W 8/205 370/329 |

* cited by examiner

*Primary Examiner* — Azizul Choudhury

(57) ABSTRACT

A wireless network system configured to secure a wireless service provided to at least one wireless device from a wireless network, the wireless network system includes a secure network server implemented in at least one of a network operator cloud and a mobile network operator implementing the wireless network. The secure network server being configured to implement at least one of the following: a unique Access Point Name (APN), an International Mobile Equipment Identity (IMEI) whitelist, a virtual private network (VPN) over encrypted network, a dedicated firewall, a whitelist of IP addresses, and a unique SIM.

18 Claims, 9 Drawing Sheets

SYSTEM AND PROCESS IMPLEMENTING A SECURE NETWORK

CROSS-REFERENCE TO RELATED APPLICATIONS

This application claims the benefit of U.S. Provisional Patent Application No. 63/223,272 filed on Jul. 19, 2021, titled "System and Process Implementing a Secure Network," the content of which is hereby incorporated by reference herein.

BACKGROUND OF THE DISCLOSURE

This disclosure relates generally to a system implementing a secure network. This disclosure further relates generally to a process implementing a secure network. This disclosure relates generally to a system implementing a secure data network. This disclosure further relates generally to a process implementing a secure data network. This disclosure relates generally to a system implementing a secure network for devices. This disclosure further relates generally to a process implementing a secure network for devices.

This disclosure relates generally to a system implementing a secure data network for internet of things (IoT) devices. This disclosure further relates generally to a process implementing a secure data network for internet of things (IoT) devices. This disclosure relates generally to a system implementing a secure network for devices implementing Machine to Machine (M2M) communication. This disclosure further relates generally to a process implementing a secure network for devices implementing Machine to Machine (M2M) communication.

Many devices, such as Internet of things (IoT) devices, have network connectivity. However, computers can access the network and subsequently access the devices. Moreover, these computers may have malware. In this case, malware may include computer viruses, worms, Trojan horses, ransomware, spyware, adware, rogue software, scareware, and/or the like. Once these computers access the network and the devices, the devices and/or the network may be subjected to the malware of these computers. Moreover, even when the devices utilize a virtual private network (VPN), this will not prevent the computer from introducing malware into the network and/or the devices.

The current solution to prevent introduction of malware into a network and/or into the devices includes locking network connectivity of the devices. Specifically, locking network connectivity of the devices. Accordingly, the devices implementing a locking of network connectivity will disable all connectivity. In particular, implementing a locking network connectivity that will disable all connectivity resulting in no Wireless Fidelity (Wi-Fi) connectivity on any network including no Wireless Fidelity (Wi-Fi) connectivity on a home network, and/or the like, no wired connectivity, such as ethernet connections, RJ45 cable connections, and/or the like, no wireless connectivity, such as broadband, Bluetooth, etc., and/or the like Accordingly, there is a need for a system and process to implement a secure network for devices, such as Internet of things (IoT) devices, to reduce the likelihood of being subjected to malware.

SUMMARY OF THE DISCLOSURE

The foregoing needs are met, to a great extent, by the disclosure, with a system and process implementing a secure network.

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a process of securing a wireless service provided to at least one wireless device from a wireless network, the process includes implementing a secure network server in at least one of a network operator cloud and a mobile network operator implementing the wireless network; implementing at least one of the following: a unique Access Point Name (APN), an International Mobile Equipment Identity (IMEI) whitelist, a virtual private network (VPN) over encrypted network, a dedicated firewall, a white list of IP addresses, and a unique SIM; receiving identification of at least one wireless device in the secure network server from an administrator; receiving securing instructions from the administrator in the secure network server for the at least one wireless device; receiving a request in the wireless network for an internet resource from at least one wireless device; comparing the request for the internet resource to the securing instructions with the secure network server to determine whether the request for an internet resource is allowed or not allowed based on the securing instructions; providing the internet resource to the wireless device with the secure network server if the request for an internet resource is allowable based on the securing instructions; and denying the internet resource to the wireless device with the secure network server if the request for an internet resource is not allowed based on the securing instructions, where the securing instructions include at least one of the following: the International Mobile Equipment Identity (IMEI) whitelist and the white list of IP addresses. Other embodiments of this aspect include corresponding computer systems, apparatus, and computer programs recorded on one or more computer storage devices, each configured to perform the actions of the methods.

One general aspect includes a wireless network system configured to secure a wireless service provided to at least one wireless device from a wireless network, the wireless network system includes a secure network server implemented in at least one of a network operator cloud and a mobile network operator implementing the wireless network; at least one wireless device configured to implement at least one of the following: a unique Access Point Name (APN), a virtual private network (VPN) over encrypted network, a dedicated firewall, and a unique SIM; the secure network server configured to implement at least one of the following: a unique Access Point Name (APN), an International Mobile Equipment Identity (IMEI) whitelist, a virtual private network (VPN) over encrypted network, a dedicated firewall, a white list of IP addresses, and a unique SIM; the secure network server configured to receive identification of at least one wireless device in the secure network server from an administrator; the secure network server configured to receive securing instructions from the administrator in the secure network server for the at least one wireless device; the secure network server configured to receive a request in the wireless network for an internet resource from at least one wireless device; the secure network server configured to compare the request for the internet resource to the securing instructions to determine whether the request for an internet resource is allowed or not allowed based on the securing instructions; the secure network server configured to provide the internet resource to the wireless device if the request for an internet resource is allowable based on the securing instructions; and the secure network server configured to deny the internet resource to the wireless device if the request for an internet resource is not allowed based on the securing instructions, where the securing instructions include at least one of the following: the International Mobile Equipment Identity (IMEI) whitelist and the white list of IP addresses. Other embodiments of this aspect include corresponding computer systems, apparatus, and computer programs recorded on one or more computer storage devices, each configured to perform the actions of the methods.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
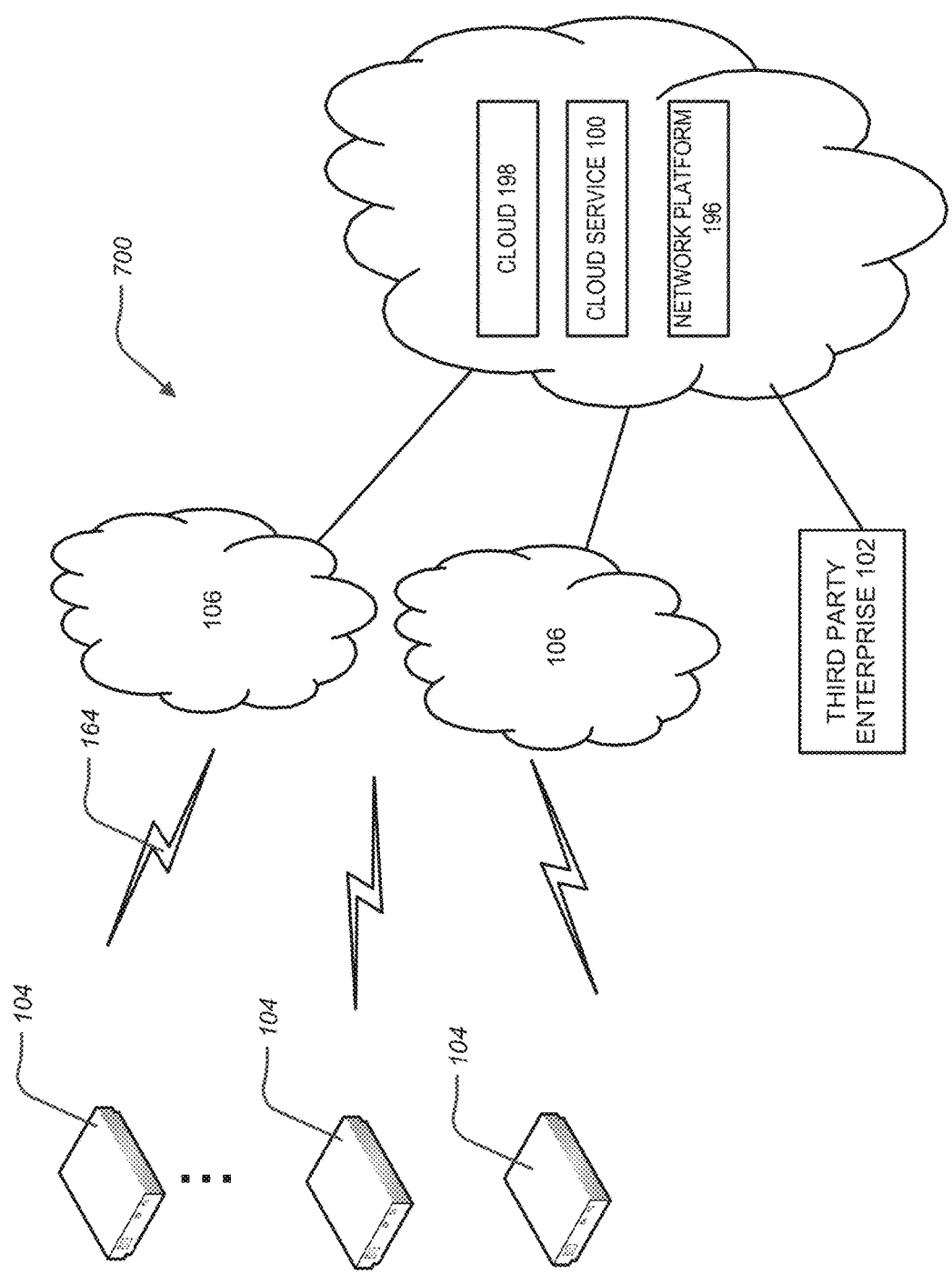
FIG. 1 illustrates an exemplary system implementing a secure network with associated components in accordance with aspects of the disclosure.

Reference in this specification to a "device" is intended to encompass any compatible mobile technology computing device that connects to a wireless communication network, such as an IoT device, a device implementing Machine to Machine (M2M) communication, a wireless device, a mobile phone, mobile equipment, mobile hotspot, wearable device, mobile station, user equipment (UE), a cellular phone, a smartphone, a handset and/or the like. For example, the device may be implemented as an APPLE® IPHONE®, an IPAD®, a GOOGLE® ANDROID® based device, a BLACKBERRY® based device, other types of PDAs, smartphones, wireless dongles, other mobile computing devices, and/or the like. The term "device" may be interchangeably used and referred to herein as "wireless device," "wireless handset," "handset," "mobile device," "mobile phone," "mobile equipment," "mobile station," "user equipment," "cellular phone," "smartphone," "mobile hotspot," "wearable device," and/or "phone." Further, reference in this specification to a "wireless network" or "network" is intended to encompass any type of wireless network from which a MVNO contracts with a MNO wireless carrier to provide mobile phone services through the use of a wireless device, such as the Global System for Mobile Communication (GSM) network, Code-Division Multiple Access (CDMA) network, 4G-LTE, 5G, a communication channel as defined herein, and/or the like, that may utilize the teachings of the present application to allow a wireless device to connect to a wireless network.

The device may be implemented as an Internet of things (IoT) device. The Internet of things (IoT) may be a network of IoT devices and/or IoT objects embedded with electronics, software, sensors, actuators, network connectivity, and/or the like which may enable these IoT devices to connect and exchange data. The IoT devices may exchange data, receive commands, transmit commands, control and/or the like. The IoT may allow the IoT devices to be sensed, controlled, and/or the like remotely across a network infrastructure, which provides direct integration of the physical world into computer-based systems resulting in improved efficiency, accuracy, and economic benefit in addition to reduced human intervention.

Reference in this specification to a device, such as an IoT object or IoT device, is intended to encompass any compatible mobile technology computing device that connects to a wireless communication network. The IoT device may be implemented as any physical device embedded with electronics, software, sensors, actuators, and/or network connectivity that enable these objects or devices to connect and exchange data, information, instructions, and/or the like. The IoT device may be implemented in a smart home, a wearable device, a smart city implementation, a smart grid implementation, an industrial implementation, a connected car implementation, a connected health related implementation, a smart retail implementation, a smart supply chain implementation, a smart farming implementation, and/or the like. The IoT device may be configured to sense, control, be controlled, and/or the like remotely across a wireless network infrastructure, creating opportunities for more direct integration of the physical world into computer-based systems, and resulting in improved efficiency, accuracy, and economic benefit in addition to reduced human intervention.

The IoT device may connect to a "wireless network" or "network" and this connection is intended to encompass any type of wireless network to obtain wireless services for the use of the IoT device, such as the Global System for Mobile Communication (GSM) network, Code-Division Multiple Access (CDMA) network, GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, a communication channel as defined herein, or the like, and/or a combination of two or more thereof, that may utilize the teachings of the disclosure to allow the IoT device to connect to a wireless network to exchange data.

Certain companies that provide wireless services, can be wireless carriers or Mobile Network Operators (MNOs) that maintain, operate, and control their own wireless networks and typically have control of their own frequency spectrum. An MNO relies heavily on backend systems to address any provisional, billing, security, and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers (MNOs) to purchase usage of their networks (e.g., minutes of voice calls, volume of data transfer, number of SMS, service days, etc.) that the MVNOs in turn sell to their own customers.

The disclosed system and process implementing a secure network may be utilized in relation to an MNO and/or a MVNO. However, implementations of the disclosed system and process implementing a secure network may have numerous benefits when implemented by a MVNO. In one aspect, implementations of the disclosed system and process implementing a secure network may have numerous benefits when implemented by a MVNO due to the multiple wireless carriers and/or multiple networks implemented by a MVNO. However, the disclosed system and process implementing a secure network may also be implemented by an MNO.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

This disclosure relates generally to a system implementing a secure network and/or a process implementing a secure network. In this regard, a cellular carrier in a core network may be configured to have full control over a routing of data traffic. The disclosed system and process implementing a secure network may create custom secure and encrypted routes for data traffic that ensures that no traffic from no other unauthorized device is able to be processed on the network. Accordingly, the disclosed system and process implementing a secure network may close the network to prevent malware from entering the system.

The disclosed system and process implementing a secure network may create a unique Access Point Name (APN), implement an International Mobile Equipment Identity (IMEI) whitelist, implement a virtual private network (VPN) over encrypted network, implement a dedicated firewall, implement a whitelist of IP addresses that can be accessed, implement a unique SIM (subscriber identity module or subscriber identification module), and/or the like.

FIG. 1 illustrates an exemplary system implementing a secure network with associated components in accordance with aspects of the disclosure.

FIG. 1 shows an exemplary implementation of a system implementing a secure network 700 that may include, interact, communicate, connect, and/or the like with one or more of a plurality of wireless networks 106, at least one device 104, a network platform 196, a third-party enterprise 102, and/or the like. In some aspects as illustrated in FIG. 1, the secure network 700 may implement a cloud 198 and/or a cloud service 100.

The secure network 700 may be configured to interact with the plurality of wireless networks 106, such as a cellular carrier, so that a core network of the plurality of wireless networks 106 has full control over the routing of data traffic. In particular, the secure network 700 may be configured to interact with the plurality of wireless networks 106 so that the core network of the plurality of wireless networks 106 has full control over the routing of data traffic between the at least one device 104, the plurality of wireless networks 106, the third-party enterprise 102, the cloud 198, the network platform 196, the cloud service 100, and/or the like.

In one aspect, the secure network 700 may be configured to interact with the at least one device 104, the plurality of wireless networks 106, the third-party enterprise 102, the cloud 198, the network platform 196, the cloud service 100, and/or the like to create custom secure and encrypted routes for data traffic that ensures that no traffic from no other unauthorized device is able to processed on the at least one device 104, the plurality of wireless networks 106, the third-party enterprise 102, the cloud 198, the network platform 196, the cloud service 100, and/or the like. In this regard, implementation of the secure network 700 may close the plurality of wireless networks 106 to prevent malware from entering the at least one device 104, the plurality of wireless networks 106, the third-party enterprise 102, the cloud 198, the network platform 196, the cloud service 100, and/or the like.

In particular aspects, the secure network 700, the plurality of wireless networks 106, the third-party enterprise 102, the at least one device 104, and/or the like may implement, create, and/or the like a unique Access Point Name (APN), an International Mobile Equipment Identity (IMEI) white list, a virtual private network (VPN) over encrypted network, a dedicated firewall, a white list of IP addresses that can be accessed, a unique SIM, and/or the like.

In particular aspects, the secure network 700, the at least one device 104, the plurality of wireless networks 106, the third-party enterprise 102, the cloud 198, the network platform 196, the cloud service 100, and/or the like may implement, create, and/or the like a unique Access Point Name (APN). The term unique is meant to define that the Access Point Name (APN) is implemented with a nonstandard name, a name that is encrypted, a name that is not publicly accessible, a name that is more difficult to determine, a name that is distinctive, a name that is not repeated, nonstandard values, values that are encrypted, values that are not publicly accessible, values that are more difficult to determine, values that are distinctive, values that are not repeated, and/or the like.

The unique Access Point Name (APN) may be a name of a gateway between the secure network 700, the plurality of wireless networks 106, the third-party enterprise 102, the cloud 198, the network platform 196, the cloud service 100, and/or the like and the at least one device 104. The at least one device 104 making a data connection may be configured with the unique Access Point Name (APN) to present to the secure network 700, the plurality of wireless networks 106, the third-party enterprise 102, the cloud 198, the network platform 196, the cloud service 100, and/or the like. The secure network 700, the plurality of wireless networks 106, the third-party enterprise 102, the cloud 198, the network platform 196, the cloud service 100, and/or the like may be configured to examine the unique Access Point Name (APN) to determine if a network connection should or should not be created. More specifically, the unique Access Point Name (APN) may identify the packet data network (PDN) that the at least one device 104 may request to communicate with. Additionally, the unique Access Point Name (APN) may include a network identifier, an operator identifier, and/or the like.

In operation, an unauthorized computer, which could possibly provide malware to the secure network 700, the plurality of wireless networks 106, the third-party enterprise 102, the cloud 198, the network platform 196, the cloud service 100, and/or the like may attempt access to the same without the unique Access Point Name (APN), the unauthorized computer may be denied access to the secure network 700, the plurality of wireless networks 106, the third-party enterprise 102, the cloud 198, the network platform 196, the cloud service 100, and/or the like. Accordingly, implementation the unique Access Point Name (APN) reduces the likelihood of an unauthorized computer from gaining access.

In this regard, implementation of the secure network 700 together with implementation of the unique Access Point Name (APN) by the at least one device 104 may close the plurality of wireless networks 106 to prevent malware from entering the at least one device 104, the plurality of wireless networks 106, the third-party enterprise 102, the cloud 198, the network platform 196, the cloud service 100, and/or the like.

In particular aspects, the secure network 700, the at least one device 104, the plurality of wireless networks 106, the third-party enterprise 102, the cloud 198, the network platform 196, the cloud service 100, and/or the like may implement, create, and/or the like an International Mobile Equipment Identity (IMEI) whitelist.

The International Mobile Equipment Identity (IMEI) may be a number of a device the at least one device 104 requests to connect. The secure network 700, the plurality of wireless networks 106, the third-party enterprise 102, the cloud 198, the network platform 196, the cloud service 100, and/or the like may be configured to examine the International Mobile Equipment Identity (IMEI) to determine if a network connection should or should not be created. In particular, the secure network 700, the plurality of wireless networks 106, the third-party enterprise 102, the cloud 198, the network platform 196, the cloud service 100, and/or the like may be configured to examine the International Mobile Equipment Identity (IMEI) and determine whether it is on the International Mobile Equipment Identity (IMEI) whitelist.

In operation, an unauthorized computer, which could possibly provide malware to the secure network 700, the plurality of wireless networks 106, the third-party enterprise 102, the cloud 198, the network platform 196, the cloud service 100, and/or the like may attempt to have the at least one device 104 connect to a device having a particular International Mobile Equipment Identity (IMEI). The at least one device 104 may be denied access to the device by the secure network 700, the plurality of wireless networks 106, the third-party enterprise 102, the cloud 198, the network platform 196, the cloud service 100, and/or the like if the device is not listed on the International Mobile Equipment Identity (IMEI) whitelist. Accordingly, implementation the International Mobile Equipment Identity (IMEI) whitelist reduces the likelihood of an unauthorized device from gaining access to the secure network 700, the plurality of wireless networks 106, the third-party enterprise 102, the cloud 198, the network platform 196, the cloud service 100, the at least one device 104 and/or the like.

In this regard, implementation of the secure network 700 together with implementation of the International Mobile Equipment Identity (IMEI) whitelist may close the plurality of wireless networks 106 to prevent malware from entering the at least one device 104, the plurality of wireless networks 106, the third-party enterprise 102, the cloud 198, the network platform 196, the cloud service 100, and/or the like.

In particular aspects, the secure network 700, the at least one device 104, the plurality of wireless networks 106, the third-party enterprise 102, the cloud 198, the network platform 196, the cloud service 100, and/or the like may implement, create, and/or the like a virtual private network (VPN) over encrypted network.

The virtual private network (VPN) over encrypted network may be implemented as a virtual private network (VPN) by the secure network 700, the at least one device 104, the plurality of wireless networks 106, the third-party enterprise 102, the cloud 198, the network platform 196, the cloud service 100, and/or the like that may extend a private network across a public network and may enable the at least one device 104 to send and receive data across the secure network 700, the plurality of wireless networks 106, the third-party enterprise 102, the cloud 198, the network platform 196, the cloud service 100, and/or the like as if the at least one device 104 was directly connected to the private network. Accordingly, the at least one device 104 may therefore benefit from the functionality, security, and management of the private network. Moreover, the virtual private network (VPN) over encrypted network may provide access to resources that may be inaccessible on the public network The virtual private network (VPN) over encrypted network may establish a virtual point-to-point connection through the use of dedicated circuits or with tunneling protocols over the secure network 700. The virtual private network (VPN) may utilize remote access configuration, site to site configurations, extranet based site to site configurations, and/or the like. The virtual private network (VPN) may implement one or more of Internet Protocol Security (IPsec), Transport Layer Security (SSL/TLS), Datagram Transport Layer Security (DTLS), Microsoft Point-to-Point Encryption (MPPE), Microsoft Secure Socket Tunneling Protocol (SSTP), Multi Path Virtual Private Network (MPVPN), Secure Shell (SSH) VPN, WireGuard protocol, and/or the like.

In this regard, implementation of the secure network 700 together with implementation of the virtual private network (VPN) over encrypted network may close the plurality of wireless networks 106 to prevent malware from entering the at least one device 104, the plurality of wireless networks 106, the third-party enterprise 102, the cloud 198, the network platform 196, the cloud service 100, and/or the like.

In particular aspects, the secure network 700, the at least one device 104, the plurality of wireless networks 106, the third-party enterprise 102, the cloud 198, the network platform 196, the cloud service 100, and/or the like may implement, create, and/or the like a dedicated firewall.

The dedicated firewall may be implemented as a network security system that monitors and controls incoming and outgoing network traffic through the secure network 700, the at least one device 104, the plurality of wireless networks 106, the third-party enterprise 102, the cloud 198, the network platform 196, the cloud service 100, and/or the like based on predetermined security rules. In this regard, the dedicated firewall may establish a barrier between the secure network 700, the at least one device 104, the plurality of wireless networks 106, the third-party enterprise 102, the cloud 198, the network platform 196, the cloud service 100, and/or the like and an untrusted network, untrusted device, and/or the like.

In this regard, implementation of the secure network 700 together with implementation of the dedicated firewall may close the plurality of wireless networks 106 to prevent malware from entering the at least one device 104, the plurality of wireless networks 106, the third-party enterprise 102, the cloud 198, the network platform 196, the cloud service 100, and/or the like.

Aspects, the secure network 700, the at least one device 104, the plurality of wireless networks 106, the third-party enterprise 102, the cloud 198, the network platform 196, the cloud service 100, and/or the like may implement, create, and/or the like a whitelist of IP addresses that can be accessed. The whitelist of IP addresses may include one or more listings of an Internet Protocol address (IP address) that may be a numerical label assigned to any device connected to a computer network that uses the Internet Protocol for communication. In aspects, the IP address may serve functions including host or network interface identification, location addressing, and/or the like. The IP address may be implemented with Internet Protocol version 4 (IPv4), which may define an IP address as a 32-bit number, Internet Protocol version 6 (IPv6), which may define an IP address with 128 bits, and/or the like.

The whitelist of IP addresses may be an address the at least one device 104 requests to connect. The secure network 700, the plurality of wireless networks 106, the third-party enterprise 102, the cloud 198, the network platform 196, the cloud service 100, and/or the like may be configured to examine the whitelist of IP addresses to determine if a network connection should or should not be created. In particular, the secure network 700, the plurality of wireless networks 106, the third-party enterprise 102, the cloud 198, the network platform 196, the cloud service 100, and/or the like may be configured to examine the requested IP address and determine whether the requested IP address is on the whitelist of IP addresses.

In operation, an unauthorized computer, which could possibly provide malware to the secure network 700, the plurality of wireless networks 106, the third-party enterprise 102, the cloud 198, the network platform 196, the cloud service 100, and/or the like may attempt to have the at least one device 104 connect to a device having a particular IP address. The at least one device 104 may be denied access to the address by the secure network 700, the plurality of wireless networks 106, the third-party enterprise 102, the cloud 198, the network platform 196, the cloud service 100, and/or the like if the address is not listed on the whitelist of IP addresses. Accordingly, implementation the whitelist of IP addresses reduces the likelihood of an unauthorized device from gaining access to the secure network 700, the plurality of wireless networks 106, the third-party enterprise 102, the cloud 198, the network platform 196, the cloud service 100, the at least one device 104 and/or the like.

In this regard, implementation of the secure network 700 together with implementation of the whitelist of IP addresses may close the plurality of wireless networks 106 to prevent malware from entering the at least one device 104, the plurality of wireless networks 106, the third-party enterprise 102, the cloud 198, the network platform 196, the cloud service 100, and/or the like.

In this regard, implementation of the secure network 700 together with implementation of the whitelist of IP addresses may close the plurality of wireless networks 106 to prevent malware from entering the at least one device 104, the plurality of wireless networks 106, the third-party enterprise 102, the cloud 198, the network platform 196, the cloud service 100, and/or the like.

In particular aspects, the secure network 700, the at least one device 104, the plurality of wireless networks 106, the third-party enterprise 102, the cloud 198, the network platform 196, the cloud service 100, and/or the like may implement, create, and/or the like a unique SIM (subscriber identity module or subscriber identification module). The term unique SIM is meant to define that a SIM card 202 of the at least one device 104 may be implemented with a nonstandard name, a name that is encrypted, a name that is not publicly accessible, a name that is more difficult to determine, a name that is distinctive, a name that is not repeated, nonstandard values, values that are encrypted, values that are not publicly accessible, values that are more difficult to determine, values that are distinctive, values that are not repeated, and/or the like.

The SIM card 202 may be implemented as an integrated circuit that may store an International Mobile Subscriber Identity (IMSI) and may store a unique key used to identify and authenticate subscribers on the wireless network 106. The SIM card 202 may also store unique network-specific information used to authenticate and identify subscribers on the wireless network 900. The network-specific information may include an Integrated Circuit Card Identifier (ICCID), a unique Authentication Key (Ki), a unique Local Area Identity (LAI), a unique Operator-Specific Emergency Number, and so on. The SIM card 202 may also store other carrier-specific data such as a unique SMSC (Short Message Service Center) number, a unique Service Provider Name (SPN), unique Service Dialing Numbers (SDN), unique Advice-Of-Charge parameters, unique Value-Added Service (VAS) applications, and/or the like.

In this regard, implementation of the secure network 700 together with implementation of the unique SIM may close the plurality of wireless networks 106 to prevent malware from entering the at least one device 104, the plurality of wireless networks 106, the third-party enterprise 102, the cloud 198, the network platform 196, the cloud service 100, and/or the like.

In one aspect, one or more of the plurality of wireless networks 106 may be implemented in wireless networks implemented at least in part by mobile network operators (MNOs). In one aspect, one or more of the plurality of wireless networks 106 may be provisioned and overseen by a mobile virtual network operator (MVNO). In this regard, the MVNO may implement a mobile virtual network operator (MVNO) cloud or cloud 198 in accordance with aspects of the disclosure. However, aspects of the disclosure are equally applicable to implementation of the secure network 700 utilizing a single wireless network implemented by an MNO, a non-MVNO implementation of the secure network 700, and/or the like. In this regard, the secure network 700 may be implemented by one or more of the plurality of wireless networks 106, the third-party enterprise 102, and/or the like.

As further shown in FIG. 1, there are illustrated two implementations of the plurality of wireless networks 106.

However, it is contemplated that any number of networks may be utilized by the secure network 700. One or more of the plurality of wireless networks 106 may connect to a respective one of the at least one device 104. Data, information, instructions, and/or the like may be exchanged between one or more of the plurality of wireless networks 106 and one or more of the at least one device 104 over a communication channel 164 as defined herein. For brevity, the data, information, instructions, and/or the like exchanged between the plurality of wireless networks 106 and the at least one device 104 may be referred to as IoT data hereinafter. In other words, the IoT data may include data, information, instructions, IoT information, IoT instructions, Machine to Machine (M2M) communication, and/or the like.

A portion of the IoT data exchanged between the plurality of wireless networks 106 and the at least one device 104 may be transmitted to the third-party enterprise 102. Moreover, a portion of the IoT data exchanged between the plurality of wireless networks 106 and the at least one device 104 may be transmitted from the third-party enterprise 102. The third-party enterprise 102 may be an entity that desires to implement the functionality of the at least one device 104. In particular, the third-party enterprise 102 may be an entity providing Internet of things functionality for a smart home, a wearable device, a smart city implementation, a smart grid implementation, an industrial implementation, a connected car implementation, a connected health related implementation, a smart retail implementation, a smart supply chain implementation, a smart farming implementation, and/or the like.

The network platform 196 as described in greater detail below operates to secure, limit, control, and/or the like the communications and the exchange of data between the secure network 700, the at least one device 104, the plurality of wireless networks 106, the third-party enterprise 102, the cloud 198, the network platform 196, the cloud service 100, and/or the like. In this regard, the at least one device 104 may be susceptible to hacking. In particular, the at least one device 104 can be susceptible to a person or device that may implement methods for breaching defenses, exploiting weaknesses, and/or the like in the at least one device 104. For example, if the at least one device 104 were to (a) acquire malware and (b) the at least one device 104 connect to an unauthorized location, operation of the at least one device 104 may be compromised. In this case, malware may include computer viruses, worms, Trojan horses, ransomware, spyware, adware, rogue software, scareware, and/or the like.

Accordingly, securing operation of the secure network 700, the at least one device 104, the plurality of wireless networks 106, the third-party enterprise 102, the cloud 198, the network platform 196, the cloud service 100, and/or the like operates to reduce hacking, to prevent hacking, to limit hacking, to limit an impact of hacking, and/or the like by preventing and/or reducing communications and the exchange of data between the at least one device 104 and the plurality of wireless networks 106 that might be a result of hacking. Accordingly, the network platform 196 in conjunction with the secure network 700 provides increased efficiency, connectivity, control, proficiency, and/or the like to the at least one device 104 and/or to the plurality of wireless networks 106.

The network platform 196, the secure network 700, the cloud service 100, and/or the like may reside in the cloud 198, one or more of the plurality of wireless networks 106, a home Public Land Mobile Network (PLMN) 120, the third-party enterprise 102, may be stand-alone, and/or the like. The network platform 196, the secure network 700, the cloud service 100, and/or the like may be implemented as a server, a computer, a system, a distributed processing system, a cloud-based system, and/or the like, or a plurality of the same. In one aspect, the network platform 196, the secure network 700, the cloud service 100, the at least one device 104, and/or the like may utilize a secure network client 298. In another aspect, network platform 196, the secure network 700, the cloud service 100, the at least one device 104, and/or the like may not require a client.

In one aspect, the network platform 196, the secure network 700, the cloud service 100, and/or the like may be implemented as Software as a Service (SaaS). In one aspect, the SaaS may be implemented as a software licensing and delivery model in which software may be licensed on a subscription basis and may be centrally hosted. For example, centrally hosted in the network platform 196, the secure network 700, the cloud service 100, and/or the like. In one aspect, the SaaS implementation of the network platform 196, the secure network 700, the cloud service 100, and/or the like may be accessed by users using a web browser. In this regard, the users may be administrators of a company implementing the at least one device 104, the third-party enterprise 102 implementing the at least one device 104, the cloud 198, the plurality of wireless networks 106, and/or the like. Reference in the specification to a "company" is meant to refer to any entity that is providing some administrative oversight to the at least one device 104 associated with the entity. Company can mean a manufacturer, a service provider, an organization, a government agency, a group of individuals, an organized body of people with a particular purpose, a business, a society, an association, and/or the like. Accordingly, reference to a company is for brevity only.

In further aspects, the SaaS implementation may be accessed by users using a thin client via a web browser. In one aspect, the SaaS implementation of the network platform 196, the secure network 700, the cloud service 100, and/or the like may be based on a multitenant architecture. In this aspect, a single version of the application with a single configuration may be implemented. The single configuration may include hardware, network, operating system, and the like for all users ("tenants"). To support scalability, the application may be installed on multiple servers and/or machines.

The cloud 198 may be implemented as a network, an internet cloud, a server, a computer, a system, a distributed processing system, a cloud-based system, an MVNO cloud, and/or the like. The cloud 198 and/or the network platform 196 may be responsible for one or more of securing, provisioning, metering, and consolidating information, wireless service, and/or the like for the third-party enterprise 102, the plurality of wireless networks 106, and/or the like for the at least one device 104. The cloud 198 and/or the network platform 196 may be configured to implement the further functionality as described in further detail below. Alternatively or additionally, the disclosure may utilize the secure network client 298 that may be associated, implemented, executed, and/or the like by the at least one device 104.

FIG. 1 further illustrates the cloud service 100. The cloud service 100 of the disclosure as described in greater detail below provides increased efficiency, connectivity, control, proficiency, and/or the like for operation of the at least one device 104. In one aspect, the cloud service 100 of the disclosure as described in greater detail below provides increased efficiency, connectivity, control, proficiency, and the like over multiple wireless carriers and/or multiple wireless networks. The cloud service 100 may be implemented by one or more servers, processors, databases, a network, an internet cloud, a computer, a system, a distributed processing system, a cloud-based system, an IoT cloud service, and/or the like. In one aspect, the network platform 196 may be implemented by the cloud service 100. In one aspect, the cloud service 100 may be implemented by the network platform 196. In one aspect, the cloud service 100 and the network platform 196 are implemented together.

Figure 2:
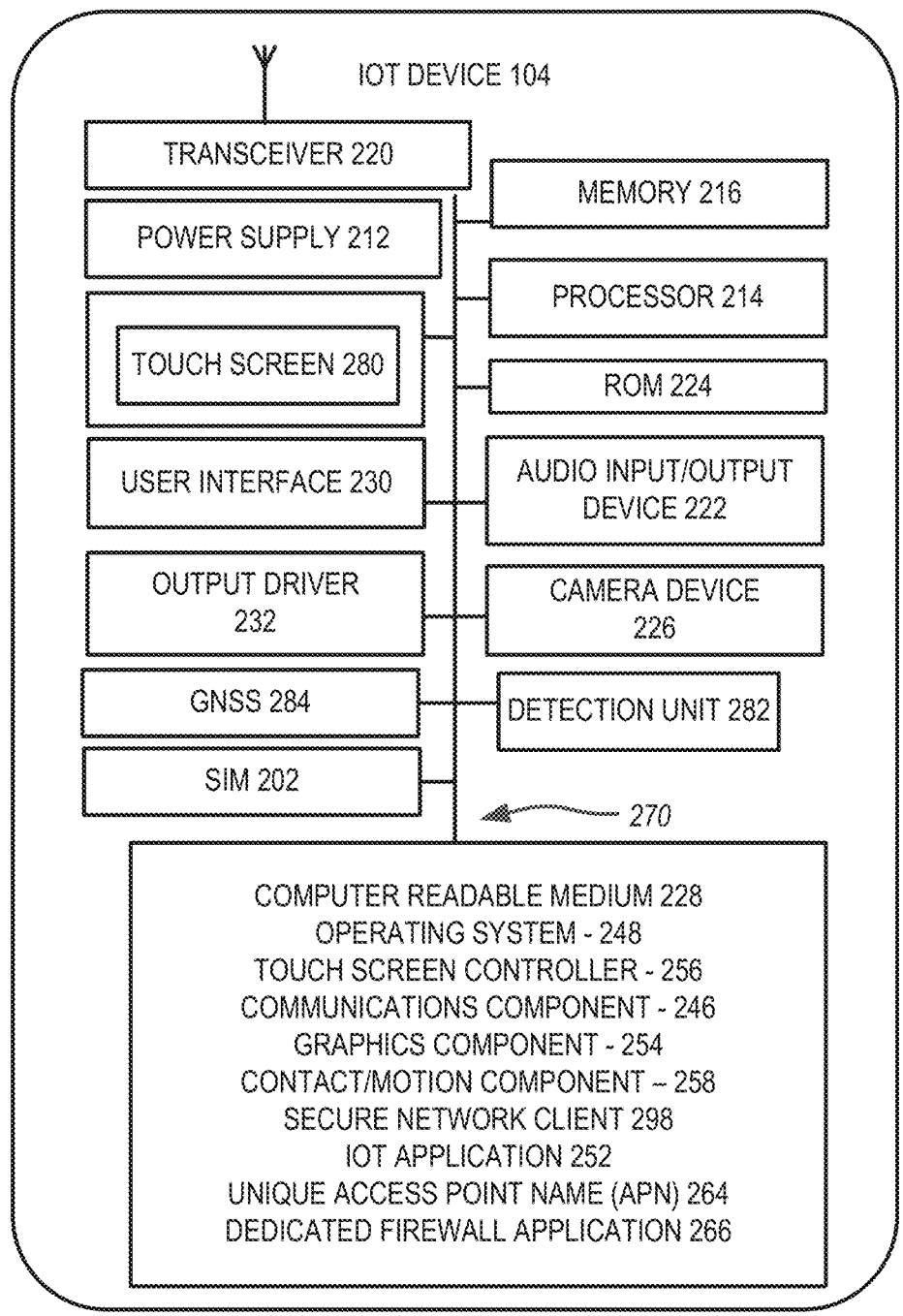
FIG. 2 shows the details of an exemplary device in accordance with aspects of the disclosure.

FIG. 2 shows the details of an exemplary device in accordance with aspects of the disclosure.

The at least one device 104 may be implemented as an IoT device, a device implementing Machine to Machine (M2M) communication, and/or the like and may include a processor 214, a memory 216, a SIM card 202, and/or the like. The processor 214 may be a central processing unit, a chipset, a microprocessor, dedicated hardware, and/or the like configured to execute instructions including instructions related to software programs.

The SIM card 202 may be implemented as an integrated circuit that may store an International Mobile Subscriber Identity (IMSI) and may store a unique key used to identify and authenticate subscribers on the wireless network 106. The SIM card 202 may also store unique network-specific information used to authenticate and identify subscribers on the wireless network 900. The network-specific information may include an Integrated Circuit Card Identifier (ICCID), a unique Authentication Key (Ki), a unique Local Area Identity (LAI), a unique Operator-Specific Emergency Number, and so on. The SIM card 202 may also store other carrier-specific data such as a unique SMSC (Short Message Service Center) number, a unique Service Provider Name (SPN), unique Service Dialing Numbers (SDN), unique Advice-Of-Charge parameters, unique Value-Added Service (VAS) applications, and/or the like.

The SIM card 202 may contain a unique serial number (ICCID), security authentication and ciphering information, temporary information related to the local network, a list of the services to which the at least one device 104 has access, passwords, such as a personal identification number (PIN), a personal unblocking key (PUK) for PIN unlocking, and/or the like.

The SIM card 202 may include a SIM processor, input/output, SIM Random-Access Memory (RAM), SIM Read-Only Memory (ROM), Electrically Erasable Programmable Read-Only Memory (EEPROM), and/or the like. The SIM card 202 may be implemented as one or more of a full-size SIM (1FF), mini-SIM (2FF), micro-SIM (3FF), nano-SIM (4FF), a soft SIM, and/or the like. The SIM card 202 may further include an operating system configured to store and provide network-specific information used to authenticate and identify subscribers on the network. The operating system may be stored in the SIM RAM, SIM ROM, the EEPROM, and/or the like.

The at least one device 104 may further include in the memory 216 or separate from the memory 216, a computer readable memory 228, an operating system 248, a communication component 246, a contact/motion component 258, a touchscreen controller 256, a graphics component 254, the secure network client 298, a unique Access Point Name (APN) 264, a dedicated firewall application 266, and/or the like. The operating system 248 together with the various components may provide software functionality for each of the components of the at least one device 104. The unique Access Point Name (APN) 264 may be implemented as described herein. The dedicated firewall application 266 may be implemented as described herein. The at least one device 104 may further include a read-only memory 224 (ROM) and a power supply 212 such as a battery or a wired connection to a power source.

The memory 216 may include a high-speed random-access memory. Also, the memory 216 may be a non-volatile memory, such as magnetic fixed disk storage, flash memory, and/or the like. The various components of the at least one device 104 may be connected through various communication lines including a data bus 270.

The secure network client 298 may be pre-installed or post-installed on the at least one device 104. In one aspect, the secure network client 298 may be an application downloaded and installed in the at least one device 104. In one aspect, the secure network client 298 may be an application available through distribution platforms called app stores, such as the Apple App Store, Google Play, Windows Phone Store, BlackBerry App World, and the like.

The secure network client 298 may secure usage of the at least one device 104. In particular, the secure network client 298 may receive data from the secure network 700, the plurality of wireless networks 106, the third-party enterprise 102, the cloud 198, the network platform 196, the cloud service 100, and/or the like for implementation of a network securing process. In one aspect, part of a network securing process 300, part of a network securing process 400, and/or part of a network securing process 500 may be implemented in the secure network client 298 and other parts of the network securing process 300, the network securing process 400, and/or the network securing process 500 and may be implemented in the secure network 700, the at least one device 104, the plurality of wireless networks 106, the third-party enterprise 102, the cloud 198, the network platform 196, the cloud service 100, and/or the like. Additionally, the secure network 700, the plurality of wireless networks 106, the third-party enterprise 102, the cloud 198, the network platform 196, the cloud service 100, and/or the like may send parameters for the securing process implemented by the at least one device 104 and/or the secure network client 298. Moreover, the secure network client 298 may send notifications to the secure network 700, the plurality of wireless networks 106, the third-party enterprise 102, the cloud 198, the network platform 196, the cloud service 100, and/or the like indicating that the securing process is being implemented and may send a log of activities. The secure network client 298 may be configured to implement the further functionality as described in further detail below.

Additionally, the at least one device 104 may include an audio input/output device 222. The audio input/output device 222 may include speakers, speaker outputs, and/or the like, providing sound output; and may include microphones, microphone inputs, and/or the like, for receiving sound inputs. The audio input/output device 222 may include an analog to digital converter and a digital to audio converter for audio input and output functions respectively.

The at least one device 104 may include a transceiver 220 and the like. The at least one device 104 implementing the transceiver 220 may provide radio and signal processing as needed to access the wireless network 106 for services over a communication channel 164 as defined herein. The processor 214 and the transceiver 220 may be configured to process instruction functions, data transfer, IoT data, and/or the like and provide other services. In one aspect, the at least one device 104 may be configured to communicate over the wireless network 106 utilizing encryption; and the cloud service 100 may be configured for decryption of data received over the wireless network 106. The processor 214 may provide the encryption and decryption functionality. In one aspect, the encryption may include a process of encoding a message, information, the IoT data, and/or the like in such a way that only authorized parties can access it and those who are not authorized cannot. In one aspect, the encryption may include an encryption scheme, the intended information or message, referred to as plaintext, may be encrypted using an encryption algorithm, which may be a cipher, generating ciphertext that can be read only if decrypted. In one aspect, the encryption scheme may use a pseudo-random encryption key generated by an algorithm. In symmetric-key schemes, the encryption and decryption keys may be the same. Communicating parties must have the same key in order to achieve secure communication. In one aspect, the encryption scheme may be a public-key encryption scheme where the encryption key is published for anyone to use and encrypt messages. However, only the receiving party has access to the decryption key that enables messages to be read.

In some aspects, the at least one device 104 may include a display 218, a user interface 230, and/or the like. The display 218 may be a liquid crystal display having a backlight to illuminate the various color liquid crystals to provide a colorful display. The user interface 230 may be any type of physical input having one or more buttons, switches, and the like and/or may be implemented as a touchscreen 280.

The touchscreen 280 of the disclosure may be implemented in the display 218 and may detect a presence and location of a touch of a user within the display area. For example, touching the display 218 of the at least one device 104 with a finger or hand. The touchscreen 280 may also sense other passive objects, such as a stylus.

In operation, the display 218 may display various objects associated with applications for execution by the processor 214. In this regard, a user may touch the display 218, and in particular the touchscreen 280, to interact with the objects. For example, touching an object may execute an application in the processor 214 associated with the object that is stored in memory 216. Additionally or alternatively, touching an object may open a menu of options to be selected by the user. The display 218 may include a plurality of the objects for the user to interact with. Moreover, the display 218 may include a plurality of screens. The display 218 showing one screen at a time. The user may interact with the display 218 to move a screen into view on the display 218. Various objects may be located in the each of the screens.

The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, and/or the like.

The at least one device 104 may include a camera device 226. The camera device 226 can include one or more cameras to provide visual input. The camera device 226 can also capture video in combination with audio from a microphone of the audio input/output device 222. The camera device 226 may include a charge coupled device (CCD), CMOS (Complementary metal-oxide-semiconductor) image sensors, Back Side Illuminated CMOS, and/or the like. Images captured by the camera device 226 may be converted, transmitted, and stored in various formats including a JPEG file format, RAW feature format such as the Android (operating system) 5.0 Lollipop, and/or the like.

The at least one device 104 may include a detection unit 282. The detection unit 282 may include or connect to a number of sensors to detect a physical quantity. The detection unit 282 may be implemented by any one or more of accelerometers, gyroscopes, altitude sensors, temperature sensor, proximity sensor, IR sensor (infrared sensor), pressure sensor, light sensor, ultrasonic sensor, smoke sensor, gas sensor, alcohol sensor, touch sensor, color sensor, humidity sensor, tilt sensor, flow sensor, level sensor, electrical sensors, and/or the like. The detection unit 282 may further include analog-to-digital converters, filters, and the like to process the signals associated with any of the sensors. The detection unit 282 may generate IoT data.

The at least one device 104 may include an output driver device 232. The output driver device 232 may be configured to provide a drive signal to control, initiate, and/or the like a component associated with the at least one device 104 based on IoT data.

The computer readable memory 228 may be configured to store an IoT control application 252. For the purposes of this disclosure, the computer readable memory 228 stores computer data, which may include computer program code that may be executable by the processor 214 of the at least one device 104 in machine readable form. By way of example, and not limitation, the computer readable memory 228 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable memory 228 or machine readable medium, which may be incorporated into a computer program product.

According to another aspect of the disclosure, the at least one device 104 may estimate the location of the at least one device 104 based, at least in part, on a global navigation satellite system (GNSS 284). In another aspect, the wireless network 106 may implement location determination based on a specific cell in which the at least one device 104 connects. In yet another aspect, the wireless network 106 may obtain location determination based on triangulation with respect to a plurality of cells in which the at least one device 104 receives signals. In one aspect, the location of the at least one device 104 may be IoT data.

Additionally, to increase security for the at least one device 104, the at least one device 104 may be implemented, configured, and/or the like to prevent hardware modifications, hardware additions, and/or the like. For example, the at least one device 104 may be configured, implemented, and/or the like such that no memory cards can be connected, the memory cards cannot load data, and/or the like.

Figure 3:
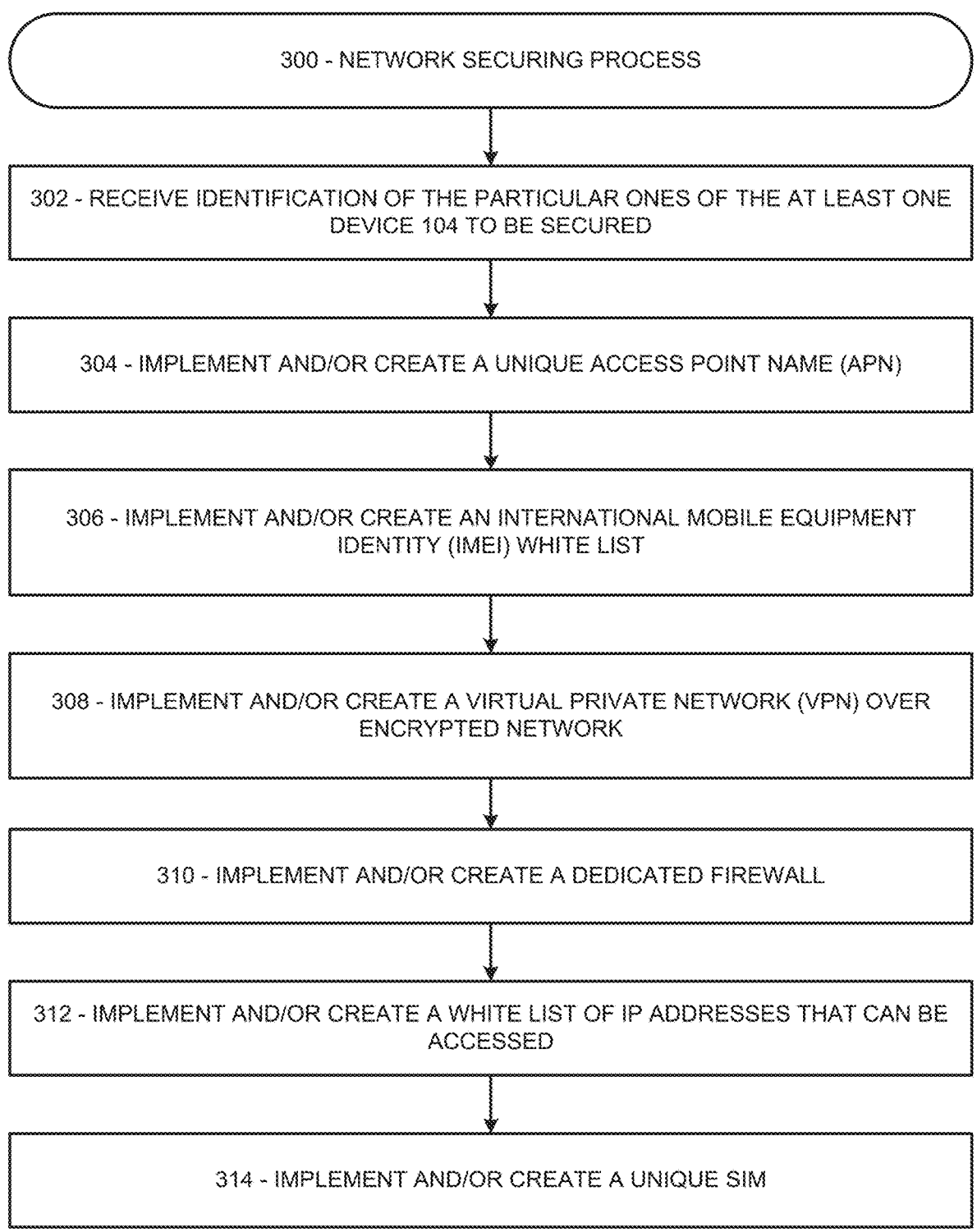
FIG. 3 shows network securing processes in accordance with aspects of the disclosure.

FIG. 3 shows network securing processes in accordance with aspects of the disclosure.

As described above, the secure network 700, the plurality of wireless networks 106, the third-party enterprise 102, the at least one device 104, the secure network client 298, the network platform 196, and/or the like may operate to secure wireless usage of the at least one device 104. In this regard, the process and functionality described for the secure network 700 may be included in one or more of the plurality of wireless networks 106, the third-party enterprise 102, the at least one device 104, the secure network client 298, the network platform 196, and/or the like.

The secure network 700 may include an aspect for the company (as defined by the disclosure), a company IoT administrator (hereinafter company administrator), and/or the like to set up the secure network 700 to be applied to the wireless service provided to the at least one device 104. In particular, the secure network 700 may implement one or more processes that may include the network securing process 300.

The network securing process 300 may implement one or more of the following processes: receive identification 302 of the particular ones of the at least one device 104 to be secured, implement and/or create a unique Access Point Name (APN) 304, implement and/or create an International Mobile Equipment Identity (IMEI) white list 306, implement and/or create a virtual private network (VPN) over encrypted network 308, implement and/or create a dedicated firewall 310, implement and/or create a white list of IP addresses that can be accessed 312, and implement and/or create a unique SIM 314.

In a particular aspect, the network securing process 300 may receive identification 302 of the particular ones of the at least one device 104 to be secured. In particular, the secure network 700, the plurality of wireless networks 106, the third-party enterprise 102, the cloud 198, the network platform 196, the cloud service 100, and/or the like may receive identification of the particular ones of the at least one device 104 to implement the network securing process 300 by receiving identification information of the at least one device 104 from the company administrator, other administrator, and/or the like. In particular, the identification information may include network—specific information as required by the network. The network-specific information may include for example one or more of a phone number, an Integrated Circuit Card Identification (ICCID), Electronic Serial Number (ESN), International Mobile Equipment Identity (International Mobile Equipment Identity (IMEI)), International Mobile Subscriber Identity (IMSI), Local Area Identity (LAI), and/or the like. Additionally, other types of information are within the spirit and scope of the disclosure. Once the secure network 700, the plurality of wireless networks 106, the third-party enterprise 102, the cloud 198, the network platform 196, the cloud service 100, and/or the like receives the identification information, the identification information may be stored in a database associated with the secure network 700, the plurality of wireless networks 106, the third-party enterprise 102, the cloud 198, the network platform 196, the cloud service 100, and/or the like.

In one aspect of the network securing process 300, the secure network 700, the plurality of wireless networks 106, the third-party enterprise 102, the cloud 198, the network platform 196, the cloud service 100, and/or the like may receive identification of the at least one device 104 by receiving identification information of the company from the company administrator. In this regard, when a company administrator logs into an account associated with the at least one device 104, the network securing process 300 may search a database for all implementations of the at least one device 104 associated with the company. Thereafter, the securing component may receive identification information automatically and the identification information may be stored in a database associated with the network securing process 300. Accordingly, the at least one device 104 of the company may be associated with the company, the company administrator, the company account, and/or the like in order for the various securing processes, customized controls, and/or the like to be implemented, more easily controlled, and/or the like. For example, the at least one device 104 of the company may be associated with the company account and may be modified as a group such that the network securing process 300, the network securing process 400, and/or the network securing process 500 implemented by all of the at least one device 104 of the company may be simultaneously modified.

The network securing process 300 may be configured to implement and/or create a unique Access Point Name (APN) 304. In particular, the network securing process 300 may be configured to process the implement and/or create a unique Access Point Name (APN) 304 as described herein.

The network securing process 300 may be configured to implement and/or create an International Mobile Equipment Identity (IMEI) whitelist 306. In particular, the network securing process 300 may be configured to implement and/or create an International Mobile Equipment Identity (IMEI) whitelist 306 as described herein.

More specifically, the network securing process 300 may receive instructions from the company administrator, the secure network 700, the plurality of wireless networks 106, the third-party enterprise 102, the cloud 198, the network platform 196, the cloud service 100, and/or the like relating to an International Mobile Equipment Identity (IMEI) whitelist for the at least one device 104. In particular, the network securing process 300 may receive an International Mobile Equipment Identity (IMEI) whitelist for the at least one device 104.

Once the network securing process 300 receives the International Mobile Equipment Identity (IMEI) whitelist, the International Mobile Equipment Identity (IMEI) whitelist may be stored in a database associated with the secure network 700, the plurality of wireless networks 106, the third-party enterprise 102, the cloud 198, the network platform 196, the cloud service 100, and/or the like.

The network securing process 300 may be configured to implement and/or create a virtual private network (VPN) over encrypted network 308. In particular, the network securing process 300 may be configured to implement and/or create a virtual private network (VPN) over encrypted network 308 as described herein.

The virtual private network (VPN) over encrypted network may be implemented as a virtual private network (VPN) by the secure network 700, the at least one device 104, the plurality of wireless networks 106, the third-party enterprise 102, the cloud 198, the network platform 196, the cloud service 100, and/or the like that may extend a private network across a public network and may enable the at least one device 104 to send and receive data across the secure network 700, the plurality of wireless networks 106, the third-party enterprise 102, the cloud 198, the network platform 196, the cloud service 100, and/or the like as if the at least one device 104 was directly connected to the private network. Accordingly, the at least one device 104 may therefore benefit from the functionality, security, and management of the private network. Moreover, the virtual private network (VPN) over encrypted network may provide access to resources that may be inaccessible on the public network The virtual private network (VPN) over encrypted network may establish a virtual point-to-point connection through the use of dedicated circuits or with tunneling protocols over the secure network 700. The virtual private network (VPN) may utilize remote access configuration, site to site configurations, extranet based site to site configurations, and/or the like. The virtual private network (VPN) may implement one or more of Internet Protocol Security (IPsec), Transport Layer Security (SSL/TLS), Datagram Transport Layer Security (DTLS), Microsoft Point-to-Point Encryption (MPPE), Microsoft Secure Socket Tunneling Protocol (SSTP), Multi Path Virtual Private Network (MPVPN), Secure Shell (SSH) VPN, WireGuard protocol, and/or the like.

The network securing process 300 may be configured to implement and/or create a dedicated firewall 310. In particular, the network securing process 300 may be configured to implement and/or create a dedicated firewall 310 as described herein.

The dedicated firewall may be implemented as a network security system that monitors and controls incoming and outgoing network traffic through the secure network 700, the at least one device 104, the plurality of wireless networks 106, the third-party enterprise 102, the cloud 198, the network platform 196, the cloud service 100, and/or the like based on predetermined security rules. In this regard, the dedicated firewall may establish a barrier between the secure network 700, the at least one device 104, the plurality of wireless networks 106, the third-party enterprise 102, the cloud 198, the network platform 196, the cloud service 100, and/or the like and an untrusted network, untrusted device, and/or the like.

The network securing process 300 may be configured to implement and/or create a whitelist of IP addresses that can be accessed 312. In particular, the network securing process 300 may be configured to implement and/or create a whitelist of IP (Internet protocol) addresses that can be accessed 312 as described herein.

More specifically, the network securing process 300 may receive instructions from the company administrator, the secure network 700, the plurality of wireless networks 106, the third-party enterprise 102, the cloud 198, the network platform 196, the cloud service 100, and/or the like relating to a whitelist of IP (Internet protocol) addresses for the at least one device 104. In particular, the network securing process 300 may receive a whitelist of IP (Internet protocol) addresses for the at least one device 104.

Once the network securing process 300 receives the whitelist of IP (Internet protocol) addresses, the whitelist of IP (Internet protocol) addresses may be stored in a database associated with the secure network 700, the plurality of wireless networks 106, the third-party enterprise 102, the cloud 198, the network platform 196, the cloud service 100, and/or the like.

The network securing process 300 may be configured to implement and/or create a unique implementation of a SIM card 202. In particular, the network securing process 300 may be configured to implement and/or create the unique implementation of the SIM 202 as described herein.

The SIM card 202 may store a unique key used to identify and authenticate subscribers on the wireless network 106. The SIM card 202 may also store unique network-specific information used to authenticate and identify subscribers on the wireless network 900. The network-specific information may include an Integrated Circuit Card Identifier (ICCID), a unique Authentication Key (Ki), a unique Local Area Identity (LAI), a unique Operator-Specific Emergency Number, and so on. The SIM card 202 may also store other carrier-specific data such as a unique SMSC (Short Message Service Center) number, a unique Service Provider Name (SPN), unique Service Dialing Numbers (SDN), unique Advice-Of-Charge parameters, unique Value-Added Service (VAS) applications, and/or the like.

Figure 4:
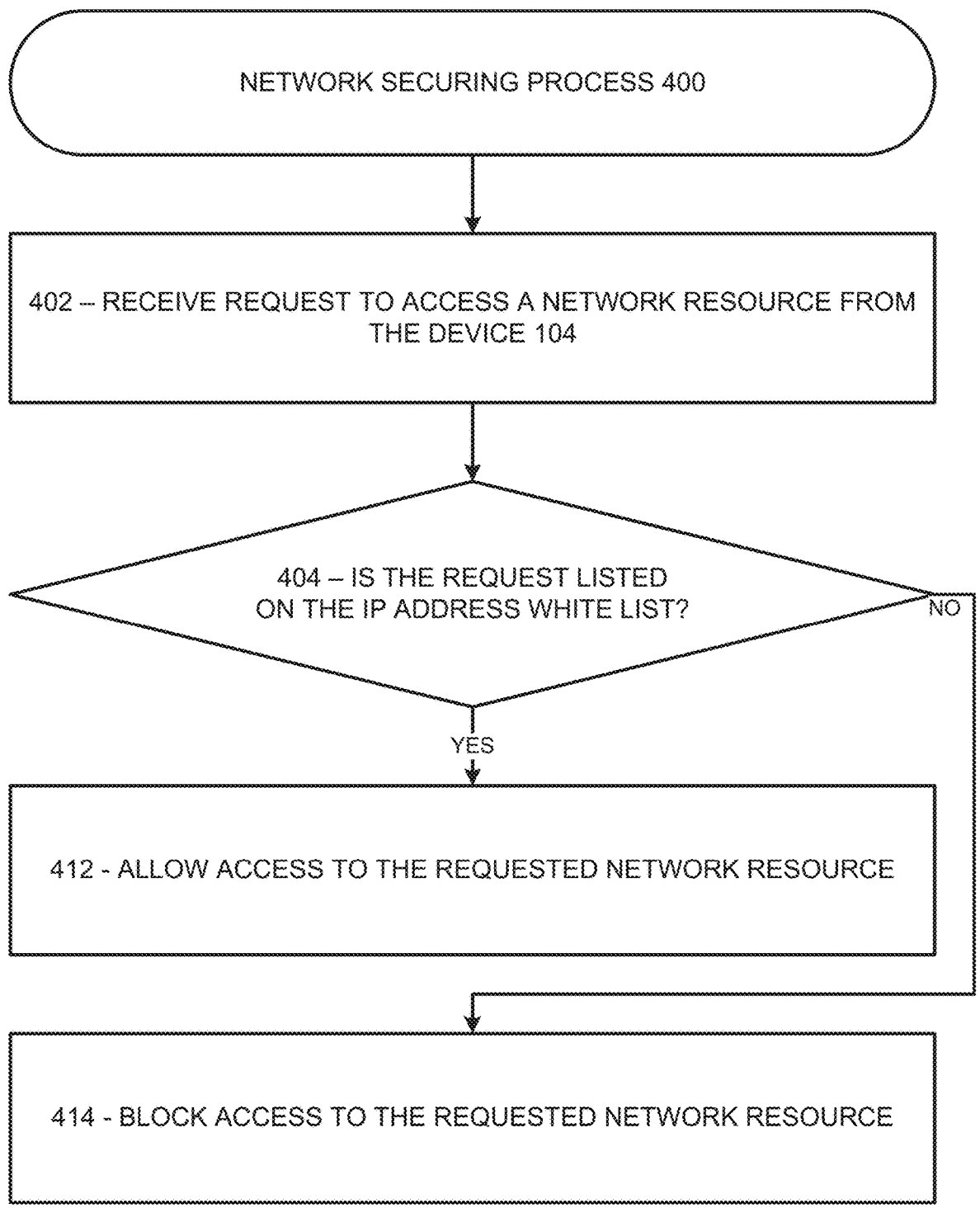
FIG. 4 shows further network securing processes in accordance with aspects of the disclosure.

FIG. 4 shows further network securing processes in accordance with aspects of the disclosure.

FIG. 4 illustrates a network securing process 400 implemented by the secure network 700, the plurality of wireless networks 106, the third-party enterprise 102, the cloud 198, the network platform 196, the cloud service 100, and/or the like.

In box 402, the secure network 700, the plurality of wireless networks 106, the third-party enterprise 102, the cloud 198, the network platform 196, the cloud service 100, and/or the like may receive a request to access a network resource from the at least one device 104. The network resource may be an IP (Internet protocol) address that may be utilized for example, to exchange of data, information, instructions, and/or the like between one or more of the plurality of wireless networks 106 and the one or more of the at least one device 104 over a communication channel 164 as defined herein.

Next, in box 404 of FIG. 4, the secure network 700, the plurality of wireless networks 106, the third-party enterprise 102, the cloud 198, the network platform 196, the cloud service 100, and/or the like may analyze the requested network resource and determine whether the request is listed on the IP (Internet protocol) address whitelist. If the requested resource is listed on the IP (Internet protocol) address whitelist, then the process advances to box 412 where the at least one device 104 may be allowed access to the requested network resource.

On the other hand, if the requested resource is not listed on the IP (Internet protocol) address whitelist the process advances to box 414. In box 414, access to the requested network resource is blocked.

Figure 5:
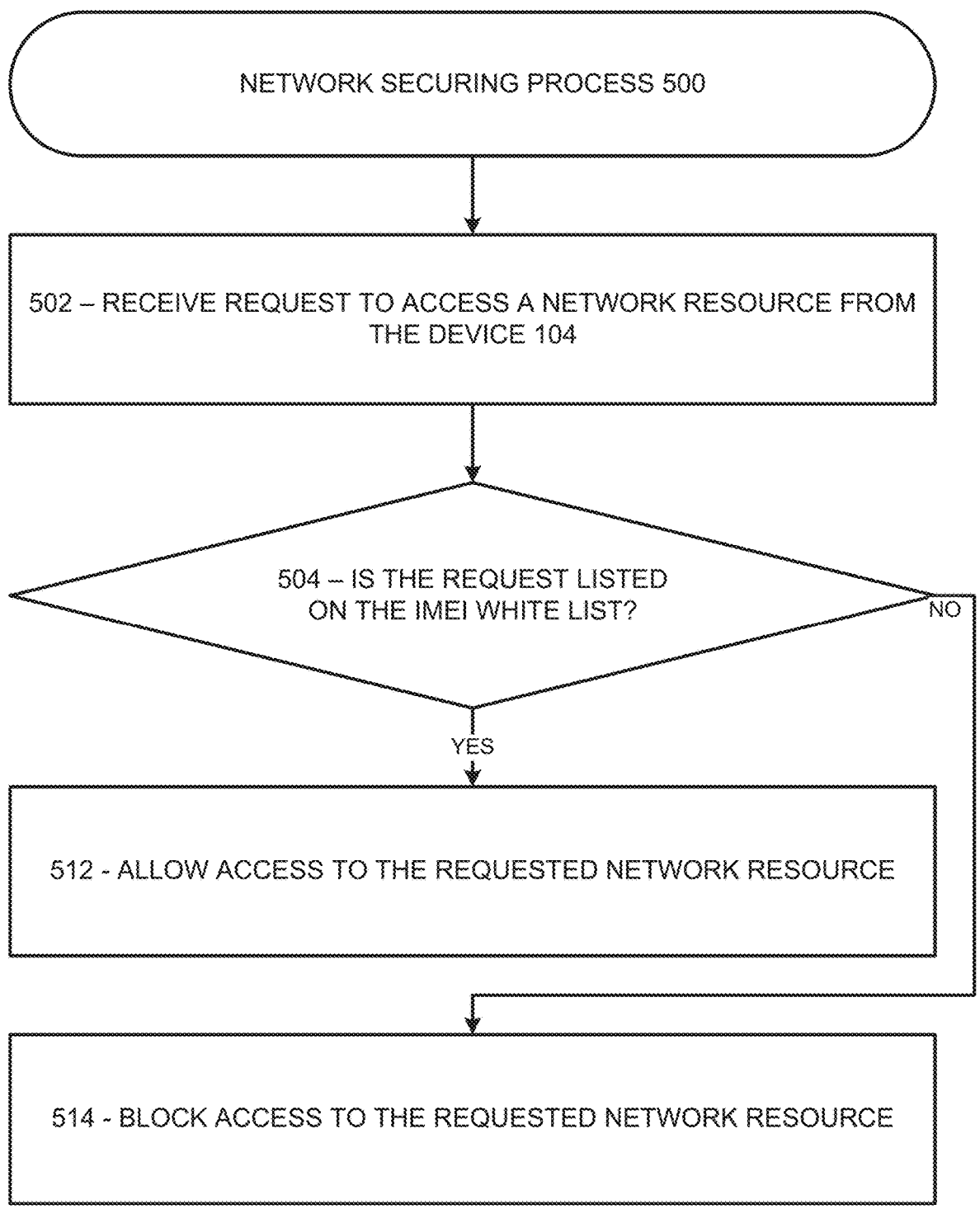
FIG. 5 shows further network securing processes in accordance with aspects of the disclosure.

FIG. 5 shows further network securing processes in accordance with aspects of the disclosure.

FIG. 5 illustrates a network securing process 500 implemented by the secure network 700, the plurality of wireless networks 106, the third-party enterprise 102, the cloud 198, the network platform 196, the cloud service 100, and/or the like.

In box 502, the secure network 700, the plurality of wireless networks 106, the third-party enterprise 102, the cloud 198, the network platform 196, the cloud service 100, and/or the like may receive a request to access a device having an International Mobile Equipment Identity (IMEI) from the at least one device 104.

Next, in box 504 of FIG. 5, the secure network 700, the plurality of wireless networks 106, the third-party enterprise 102, the cloud 198, the network platform 196, the cloud service 100, and/or the like may analyze the request to access a device having International Mobile Equipment Identity (IMEI) from the at least one device 104. If the requested device is listed on the International Mobile Equipment Identity (IMEI) whitelist, then the process advances to box 512 where the at least one device 104 may be allowed access to the device.

On the other hand, if the requested device is not listed on the International Mobile Equipment Identity (IMEI) whitelist the process advances to box 514. In box 514, access to the requested device is blocked.

Figure 6:
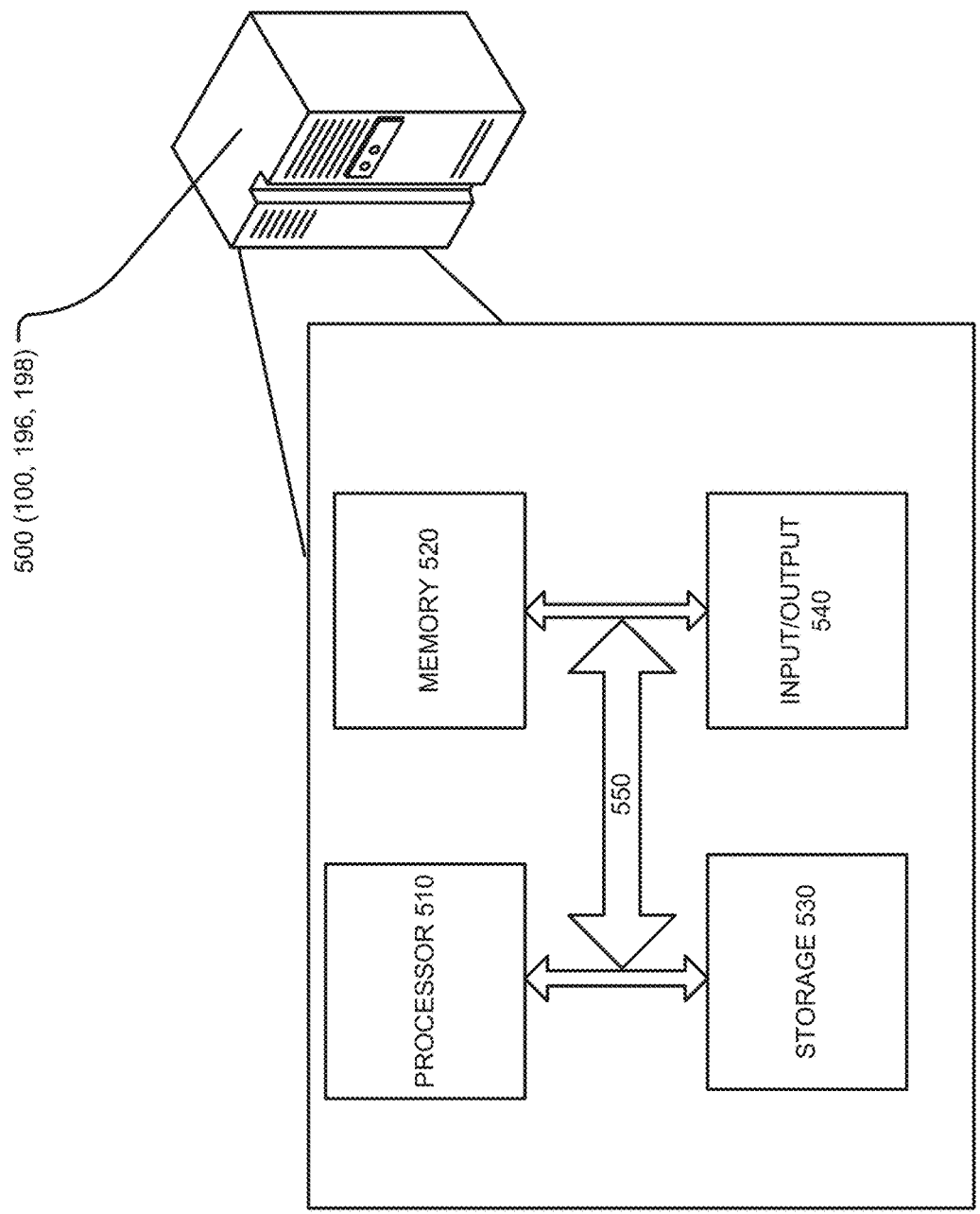
FIG. 6 shows a schematic diagram of an exemplary computer system in accordance with aspects of the disclosure.

FIG. 6 shows a schematic diagram of an exemplary computer system in accordance with aspects of the disclosure.

FIG. 6 illustrates a computer system 500 that can be used to implement at least in part the secure network 700, the network platform 196, the cloud 198, the cloud service 100 and/or like. In particular, the computer system 500 may operate to provide some or all of the securing component functionality as described herein. The computer system 500 may include a processor 510, a memory 520, a storage device 530, an input/output device 540, and/or the like. Each of the processor 510, the memory 520, the storage device 530, the input/output device 540 and/or the like can, for example, be interconnected using a system bus 550. The processor 510 may be capable of processing instructions for execution of the part of a network securing process 300, part of a network securing process 400, and/or part of a network securing process 500 within the computer system 500. In one implementation, the processor 510 is a single-threaded processor. In another implementation, the processor 510 may be a multi-threaded processor. The processor 510 may be capable of processing instructions stored in the memory 520 or on the storage device 530 to provide communications to the at least one device 104. In one aspect, the storage device 530 may log all blocked access to the at least one device 104. In some aspects, a parallel processing set of computer systems 500 connected over a network may be employed, clustered into one or more server centers.

The memory 520 may store information within the computer system 500. In one implementation, the memory 520 is a computer-readable medium. In one implementation, the memory 520 is a volatile memory unit. In another implementation, the memory 520 is a non-volatile memory unit. The storage device 530 may be capable of providing mass storage for the computer system 500. In one implementation, the storage device 530 is a computer-readable medium. In various implementations, the storage device 530 can, for example, include a hard disk device, an optical disk device, or some other large capacity storage device. The input/output device 540 provides input/output operations for the computer system 500.

In one aspect, the memory 520 and/or the storage device 530 may store software for implementing the network securing process 300, the network securing process 400, and/or the network securing process 500. Additionally, the processor 510 may operate in conjunction with the memory 520 and/or the storage device 530 in order to execute the network securing process 300 and/or the network securing process 400.

Figure 7:
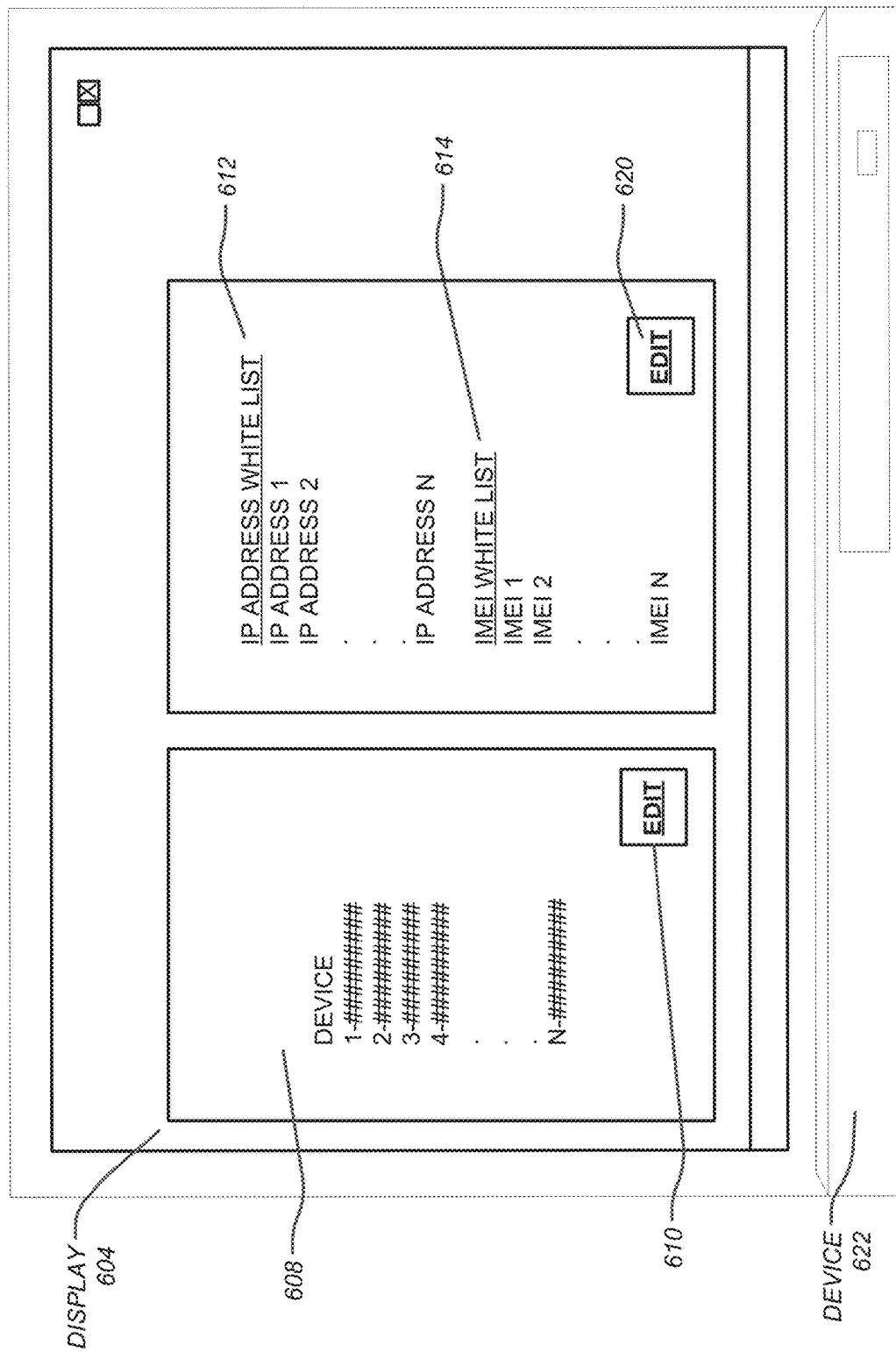
FIG. 7 shows an exemplary computer system graphical user interface in accordance with aspects of the disclosure.

FIG. 7 shows an exemplary computer system graphical user interface in accordance with aspects of the disclosure.

FIG. 7 shows a device 622 such as a personal computer, laptop, and/or the like. The device 622 may have a display that provides the graphical user interface. The device 622 may be implemented by the company administrator to implement, modify, and/or the like the network securing process 300 and/or the network securing process 400. The company administrator may utilize a web browser to connect to the secure network 700, the network platform 196, the cloud 198, the cloud service 100, and/or the like which may include logon identification and logon password functionality.

Once the company administrator has gained access to the network platform 196, the cloud 198, the cloud service 100, and/or the like they may review, add, remove, and/or the like particular ones of the at least one device 104 and/or the like (devices 608) by interacting with the webpage such as by clicking an edit button 610 consistent with Box 302 of the network securing process 300.

As further shown in FIG. 7, the company administrator may interact with the device 622 and web browser to review, add, remove, an IP address 612 by interacting with the webpage such as by clicking an edit button 620 consistent with Box 312 of the network securing process 300. It should be noted that FIG. 7 is merely exemplary. The device 622 may connect to the secure network 700, the network platform 196, the cloud 198, the cloud service 100, and/or the like in other ways, directly, indirectly, and/or the like. Moreover, the particular layout and information provided on the display 604 may be provided in other ways as well.

As further shown in FIG. 7, the company administrator may interact with the device 622 and web browser to review, add, remove, an International Mobile Equipment Identity (IMEI) whitelist 614 by interacting with the webpage such as by clicking an edit button 620 consistent with Box 306 of the network securing process 300. It should be noted that FIG. 7 is merely exemplary. The device 622 may connect to the secure network 700, the network platform 196, the cloud 198, the cloud service 100, and/or the like in other ways, directly, indirectly, and/or the like. Moreover, the particular layout and information provided on the display 604 may be provided in other ways as well.

Figure 8:
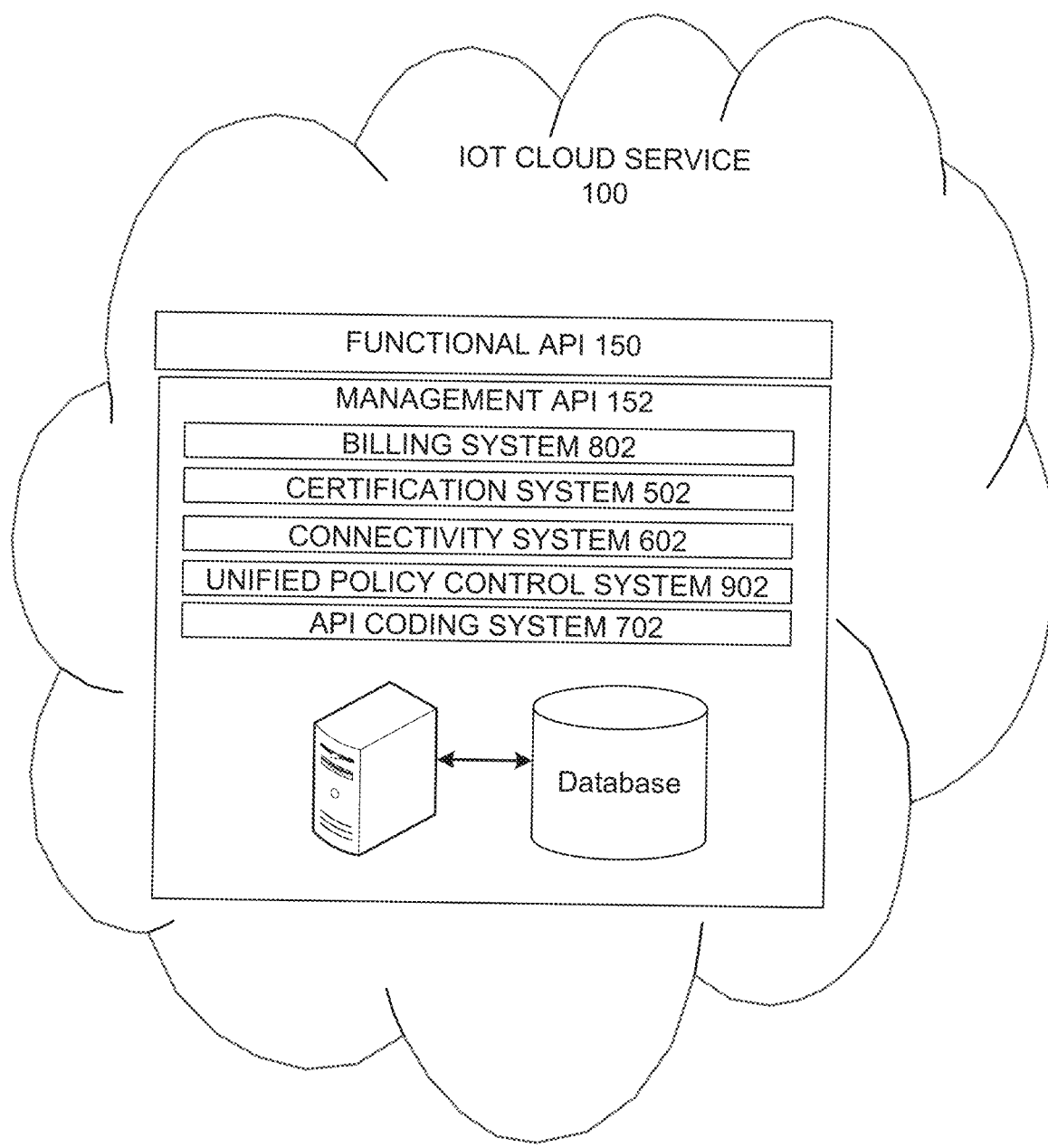
FIG. 8 further illustrates details of an exemplary IoT cloud service in accordance with aspects of the disclosure.

FIG. 8 further illustrates details of an exemplary IoT cloud service in accordance with aspects of the disclosure.

The cloud service 100 may include a functional application programming interface (API) system 150 and a management API system 152. The management API system 152 may include, connect, implement, and the like a certification system 502, a connectivity system 602, an API coding system 702, a billing system 802, and a unified policy control system 902.

In some aspects of the disclosure, one or more of the management API system 152, the certification system 502, the connectivity system 602, the API coding system 702, the billing system 802, and the unified policy control system 902 may include a web portal. The web portal may be a specially designed website that brings information from diverse sources. In some aspects, each information source gets a dedicated area on the page for displaying information (a portlet). In some aspects, the portal may include mashups and intranet "dashboards." The portal may use an application programming interface (API). The portal may provide a way for enterprises and organizations with access control, modification, procedures, and the like for multiple applications and databases. The features available may be restricted to an authorized and authenticated user (employee, member).

The certification system 502 may be implemented by the management API system 152 to ensure certification of the at least one device 104 within the wireless network 106. The connectivity system 602 may be implemented by the management API system 152 to ensure connectivity between the at least one device 104, the wireless network 106, and the third-party enterprise 102. The API coding system 702 may be implemented by the management API system 152 to ensure proper API coding for implementation of the at least one device 104 in the wireless network 106 and in conjunction with the third-party enterprise 102. The billing system 802 may be implemented by the management API system 152 to ensure proper billing of the wireless services of the at least one device 104 in the wireless network 106 as well as the billing associated with operation of the functional application programming interface (API) system 150. The unified policy control system 902 may be implemented by the management API system 152 to ensure proper policy and control of the at least one device 104 in the wireless network 106.

In various aspects, the management API system 152 may include a processor. The processor may be implemented as a PC, CPU, server, and the like. The processor may interact with, connect to, and support the certification system 502, the connectivity system 602, the API coding system 702, the billing system 802, and the unified policy control system 902.

In various aspects, the management API system 152 may include a database. The database may include digital storage for implementation of the management API system 152. The database may also provide storage for the certification system 502, the connectivity system 602, the API coding system 702, the billing system 802, and the unified policy control system 902. In one aspect, the database may utilize and implement blockchain technology. In this regard, the database may take the received data as a list of records, that may be defined as blocks. Each of the blocks of the data may be linked using cryptography. Each block may contain a cryptographic hash of the previous block, a timestamp, and the data. The blockchain may be managed by the database adhering to a protocol for inter-node communication and validation of new blocks. In some aspects, the resulting blockchain of the data may form a blockchain ledger that may not be easily modified, changed, and the like to ensure a higher level of security and data confidence. In one aspect, the block chain may be implemented as a public blockchain, a private blockchain, a consortium blockchain, and/or the like.

In one or more aspects, the management API system 152 and/or the functional application programming interface (API) system 150 may be configured to run commands for the at least one device 104 on Windows, macOS, and Linux. These commands may allow the creation and management of the at least one device 104, certificates, rules, and policies. In one or more aspects, the management API system 152 and/or the functional application programming interface (API) system 150 may be configured to build IoT applications for the at least one device 104 using HTTP or HTTPS requests. These API actions allow the program creation and management of the at least one device 104, certificates, rules, and policies. In one or more aspects, the management API system 152 and/or the functional application programming interface (API) system 150 may be configured to build IoT applications using language-specific APIs. The associated SDKs may wrap the HTTP/HTTPS API and allow programming in any of the supported languages. In one or more aspects, the management API system 152 and/or the functional application programming interface (API) system 150 may be configured to build applications that run on the at least one device 104 that send messages to and receive messages from the management API system 152, the functional application programming interface (API) system 150, and/or the at least one device 104.

The certification system 502 may include, connect, implement, and the like the management API system 152, the connectivity system 602, the API coding system 702, the billing system 802, and the unified policy control system 902.

The certification system 502 may be implemented by the management API system 152 to ensure certification of the at least one device 104 within the wireless network 106. In particular, the certification system 502 may facilitate integration of the at least one device 104 to their ecosystem. In some aspects, the certification processes ensure the at least one device 104 are properly integrated (interfaces, data exchange, and logic) and are working with the IoT platform 160. In some aspects, the certification system 502 may be implemented by the management API system 152 to ensure certification of the at least one device 104 across multiple wireless carriers and/or multiple wireless networks 106 to facilitate integration of the at least one device 104 to their ecosystem and to ensure proper integration with the multiple wireless carriers and/or the multiple wireless networks 106 with the with the IoT platform 160.

In various aspects, the certification system 502 may include a processor. The processor may be implemented as a PC, CPU, server, and the like. The processor may interact with, connect to, and support the management API system 152, the connectivity system 602, the API coding system 702, the billing system 802, and the unified policy control system 902.

In various aspects, the certification system 502 may include a database. The database may include digital storage for implementation of the certification system 502. The database may also provide storage for the management API system 152, the connectivity system 602, the API coding system 702, the billing system 802, and the unified policy control system 902.

The connectivity system 602 may include, connect, implement, and the like the management API system 152, the certification system 502, the API coding system 702, the billing system 802, and the unified policy control system 902.

The connectivity system 602 may be implemented by the management API system 152 to ensure connectivity between the at least one device 104, the wireless network 106, and the third-party enterprise 102. In particular, the connectivity system 602 ensures that the at least one device 104 are connecting to the wireless network 106 and they are properly exchanging data across the wireless network 106 as well as exchanging data with the third-party enterprise 102. In some aspects, the connectivity system 602 ensures that the at least one device 104 are connecting to multiple wireless carriers and/or multiple wireless networks 106 and they are properly exchanging data across the multiple wireless networks 106 as well as exchanging data with the third-party enterprise 102.

In various aspects, the connectivity system 602 may include a processor. The processor may be implemented as a PC, CPU, server, and the like. The processor may interact with, connect to, and support the management API system 152, the certification system 502, the API coding system 702, the billing system 802, and the unified policy control system 902.

In various aspects, the connectivity system 602 may include a database. The database may include digital storage for implementation of the connectivity system 602. The database may also provide storage for the management API system 152, the certification system 502, the API coding system 702, the billing system 802, and the unified policy control system 902.

The API coding system 702 may include, connect, implement, and the like the management API system 152, the connectivity system 602, certification system 502, the billing system 802, and the unified policy control system 902.

The API coding system 702 may be implemented by the management API system 152 to ensure proper API coding for implementation of the at least one device 104 in the wireless network 106 and in conjunction with the third-party enterprise 102. In particular, the API coding system 702 ensures the API coding subroutine definitions, protocols, tools, and the like and associated methods of communication between various software components are properly operating. In some aspects, the APIs may include a specification that can take many forms, but may include specifications for routines, data structures, object classes, variables, or remote calls. In some aspects, the API coding system 702 may be implemented by the management API system 152 to ensure proper API coding for implementation of the at least one device 104 in multiple wireless carriers and/or multiple wireless networks 106 and in conjunction with the third-party enterprise 102.

In various aspects, the API coding system 702 may include a processor. The processor may be implemented as a PC, CPU, server, and the like. The processor may interact with, connect to, and support the management API system 152, the certification system 502, the connectivity system 602, the billing system 802, and the unified policy control system 902.

In various aspects, the API coding system 702 may include a database. The database may include digital storage for implementation of the API coding system 702. The database may also provide storage for the management API system 152, the certification system 502, the connectivity system 602, the billing system 802, and the unified policy control system 902.

The billing system 802 may include, connect, implement, and the like the management API system 152, the connectivity system 602, certification system 502, the API coding system 702, and the unified policy control system 902.

The billing system 802 may be implemented by the management API system 152 to ensure proper billing of the wireless services of the at least one device 104 in the wireless network 106 as well as the billing associated with operation of the functional application programming interface (API) system 150. In particular, the billing system 802 may operate to gather billing information from the home Public Land Mobile Network (PLMN) 120, the Online Charging System (OCS) 124, the Policy and Charging Rules Function (PCRF) 126, the public data network (PDN) gateway (GW) 112 and/or the like as well as the functional application programming interface (API) system 150. In some aspects, the billing system 802 may be implemented by the management API system 152 to ensure proper billing of the wireless services of the at least one device 104 in multiple wireless carriers and/or multiple wireless networks 106 as well as the billing associated with operation of the functional application programming interface (API) system 150.

In various aspects, the billing system 802 may include a processor. The processor may be implemented as a PC, CPU, server, and the like. The processor may interact with, connect to, and support the management API system 152, the certification system 502, the connectivity system 602, the API coding system 702, and the unified policy control system 902.

In various aspects, the billing system 802 may include a database. The database may include digital storage for implementation of the billing system 802. The database may also provide storage for the management API system 152, the certification system 502, the connectivity system 602, the API coding system 702, and the unified policy control system 902.

The unified policy control system 902 may include, connect, implement, and the like the management API system 152, the connectivity system 602, certification system 502, the API coding system 702, and the billing system 802.

The unified policy control system 902 may be implemented by the management API system 152 to ensure proper policy and control of the at least one device 104 in the wireless network 106. In this regard, the unified policy control system 902 may include a policy stored in a database 904. Moreover, the unified policy control system 902 may apply the policy in interactions between the third-party enterprise 102, the functional application programming interface (API) system 150, and/or the wireless network 106. In particular aspects, the unified policy control system 902 may be implemented by the management API system 152 to ensure proper policy and control of the at least one device 104 in multiple wireless carriers and/or multiple wireless networks 106.

In various aspects, the unified policy control system 902 may include a processor. The processor may be implemented as a PC, CPU, server, and the like. The processor may interact with, connect to, and support the management API system 152, the certification system 502, the connectivity system 602, the API coding system 702, and the billing system 802.

In various aspects, the unified policy control system 902 may include a database. The database may include digital storage for implementation of the unified policy control system 902. The database may also provide storage for the management API system 152, the certification system 502, the connectivity system 602, the API coding system 702, and the billing system 802.

Referring to FIG. 1, in various aspects the cloud service 100 may include a functional application programming interface (API) system 150. In one aspect, the cloud service 100 may include a management API system 152. In one aspect, the cloud service 100 may include the management (API) system 152 and the functional application programming interface (API) system 150.

In some aspects, the APIs of the functional application programming interface (API) system 150 and the management API system 152 may include a set of subroutine definitions, protocols, tools, and the like. These may include a set of clearly defined methods of communication between various software components. The APIs may be for a web-based system, operating system, database system, computer hardware, software library, or the like. In some aspects, the APIs may include a specification that can take many forms, but may include specifications for routines, data structures, object classes, variables, or remote calls. The APIs may be implemented by POSIX, Windows API, ASPI, and the like.

The functional application programming interface (API) system 150 may implement or connect to an on-demand cloud computing platform. For example, the functional application programming interface (API) system 150 may implement Amazon Web Services (AWS). AWS is a subsidiary of Amazon.com that provides on-demand cloud computing platforms to individuals, companies, and governments, on a paid subscription basis. The functional application programming interface (API) system 150 may allow subscribers to have at their disposal a full-fledged virtual cluster of computers, available all the time, through the internet. The functional application programming interface (API) system 150 may implement virtual computers that may include a number of the attributes of a real computer including a central processing unit (CPU), graphics processing unit (GPU), Random-access memory (RAM), hard-disk storage, solid-state drive (SSD) storage, and/or the like. The functional application programming interface (API) system 150 may include a choice of operating systems and networking. The functional application programming interface (API) system 150 may have pre-loaded application software such as web servers, databases, CRM, etc. The functional application programming interface (API) system 150 may also virtualize its console I/O (keyboard, display, and mouse), allowing subscribers to connect to their system using a browser. The browser acts as a window into the virtual computer, letting subscribers log-in, configure, and use their virtual systems just as they would a real physical computer.

The management API system 152 may aggregate, process, control, and the like multiple functions between the third-party enterprise 102, the at least one device 104 and the functional application programming interface (API) system 150. In this regard, certain aspects of the management API system 152 may implement certification functions, connectivity functions, API coding functions, billing functions, unified policy control functions, and the like.

Figure 9:
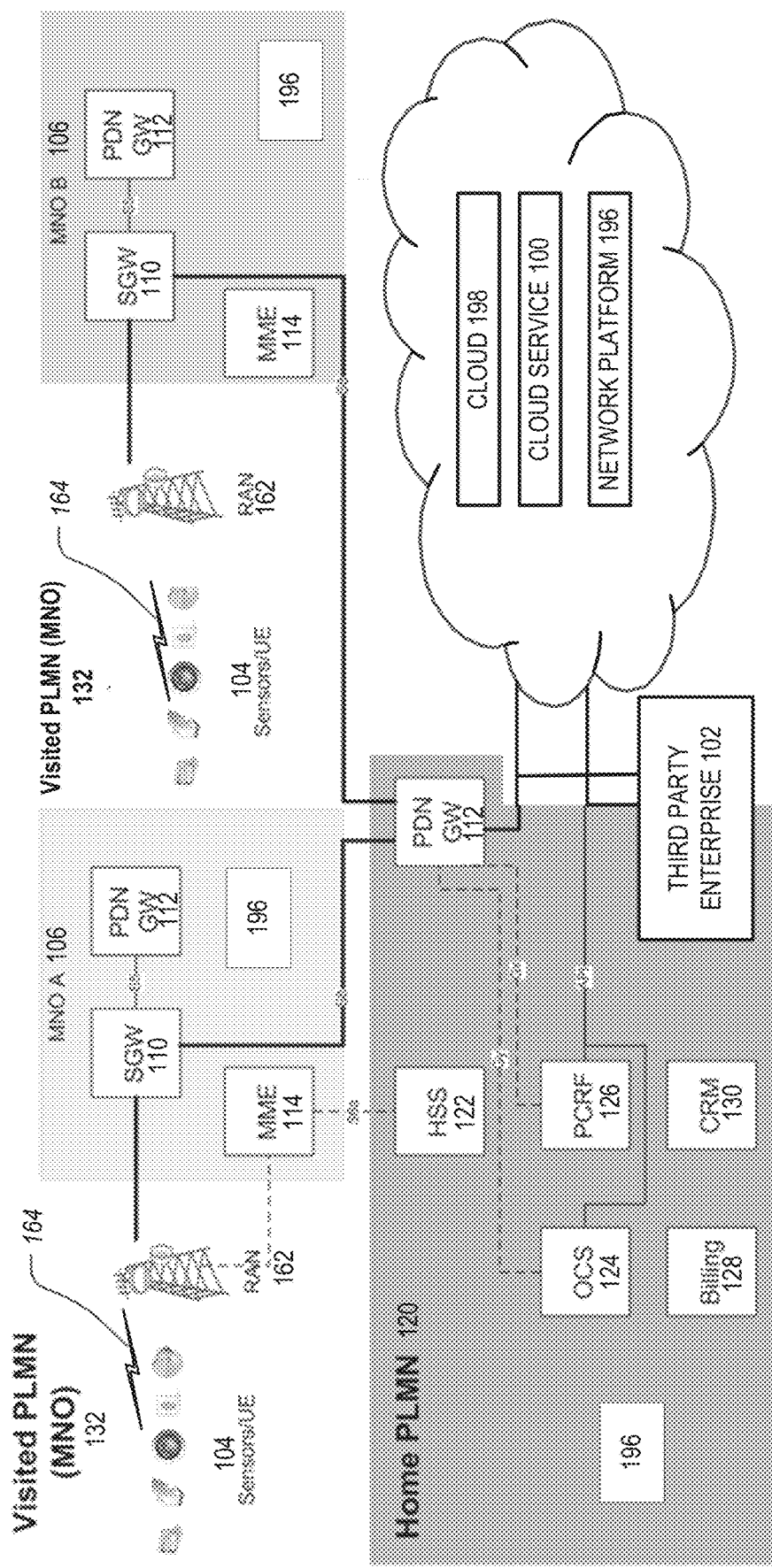
FIG. 9 illustrates a further exemplary system implementing a secure network with associated components in accordance with aspects of the disclosure.

FIG. 9 illustrates a further exemplary system implementing a secure network with associated components in accordance with aspects of the disclosure.

One or more of the plurality of wireless networks 106 may include one or more of a radio access network (RAN) 162, a home Public Land Mobile Network (PLMN) 120, a Mobility Management Entity (MME) 114, a Signaling Gateway (SGW) 110, a home subscriber server (HSS) 122, a public data network (PDN) gateway (GW) 112, an Online Charging System (OCS) 124, a Policy and Charging Rules Function (PCRF) 126, a billing component 128, a Customer Relationship Management (CRM) 130, and/or the like. In alternative or additional aspects, one or more of the plurality of wireless networks 106 may include a base transceiver station (BTS), a base station controller (BSC), a mobile switching center (MSC), and/or the like overseen by a network operator. Other types of wireless networks utilizing a communication channel as defined herein are contemplated as well. The wireless network 106 may communicate with the at least one device 104 over a communication channel 164 as defined herein.

Referring to FIG. 9, in various aspects one or more of the plurality of wireless networks 106 may include the radio access network (RAN) 162. The radio access network (RAN) 162 may be implemented as part of a mobile telecommunication system of the wireless network 106. The radio access network (RAN) 162 may implement a radio access technology. The radio access network (RAN) 162 may reside between the at least one device 104 and the cloud service 100 and provide a connection with a core network (CN).

One or more of the plurality of wireless networks 106 may include the Mobility Management Entity (MME) 114. The Mobility Management Entity (MME) 114 may function as a key control-node. The Mobility Management Entity (MME) 114 may be responsible for idle mode of the at least one device 104 as well as paging and tagging procedures including retransmissions. The Mobility Management Entity (MME) 114 may be involved in the bearer activation/deactivation process and may also be responsible for choosing a Signaling Gateway (SGW) 110 for the at least one device 104 at the initial attach and at a time of intra-LTE handover involving Core Network (CN) node relocation. The Mobility Management Entity (MME) 114 may be responsible for authenticating the at least one device 104 by interacting with the home subscriber server (HSS) 122. Non-Access Stratum (NAS) signaling may terminate at the Mobility Management Entity (MME) 114 and may also be responsible for generation and allocation of temporary identities to the at least one device 104. The Mobility Management Entity (MME) 114 may check the authorization of the at least one device 104 to camp on the service provider's Public Land Mobile Network (PLMN) and may enforce roaming restrictions on the at least one device 104. The Mobility Management Entity (MME) 114 may be a termination point in the wireless network 106 for ciphering/integrity protection for NAS signaling and may handle the security key management. The Mobility Management Entity (MME) 114 may also provide a control plane function for mobility between LTE and 2G/3G access networks with an S3 interface terminating at the Mobility Management Entity (MME) 114 from the Serving GPRS Support Node (SGSN). The Mobility Management Entity (MME) 114 may also terminate an S6a interface towards the home subscriber server (HSS) 122 for roaming implementations of the at least one device 104.

The Signaling Gateway (SGW) 110 may be implemented as a network component responsible for transferring signaling messages (e.g., information related to call establishment, billing, location, short messages, address conversion, and other services) between Common Channel Signaling (CCS) nodes that communicate using different protocols and transports.

One or more of the plurality of wireless networks 106 may include the home subscriber server (HSS) 122, or user profile server function (UPSF). The home subscriber server (HSS) 122 may be a master user database that supports IP Multimedia Core Network Subsystem (IMS) network entities. It may contain the subscription-related information (subscriber profiles), performs authentication and authorization of the user, and can provide information about the subscriber's location and IP information. In other aspects, the wireless networks 106 may be implemented without the home subscriber server (HSS) 122.

One or more of the plurality of wireless networks 106 may include the public data network (PDN) gateway (GW) 112. The public data network (PDN) gateway (GW) 112 may contain devices such as protocol translators, impedance matching devices, rate converters, fault isolators, or signal translators as necessary to provide system interoperability. The public data network (PDN) gateway (GW) 112 may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

The wireless network 106 may include an S5/S8 interface that may be used within the Evolved Packet Core (EPC) for LTE. The S5 interface may provide user plane tunneling and tunnel management between a serving GW and public data network (PDN) gateway (GW) 112. It may be used for Serving GW relocation due to the at least one device 104 mobility and if the serving GW needs to connect to a non-collocated implementation of the public data network (PDN) gateway (GW) 112 for the required PDN connectivity.

The wireless network 106 may further include the Online Charging System (OCS) 124. The Online Charging System (OCS) 124 may be a system allowing a communications service provider to charge their customers, in real time, based on service usage. The Online Charging System (OCS) 124 may communicate with the billing component 128.

The wireless network 106 may further include a Policy and Charging Rules Function (PCRF) 126. The Policy and Charging Rules Function (PCRF) 126 may be a software node designated in real-time to determine policy rules in a multimedia network. In some aspects, the Policy and Charging Rules Function (PCRF) 126 may be a policy tool. The Policy and Charging Rules Function (PCRF) 126 may be a component that operates at the network core and accesses subscriber databases and other specialized functions, such as a charging system, in a centralized manner. The Policy and Charging Rules Function (PCRF) 126 may be part of the network architecture that aggregates information to and from the wireless network 106, operational support systems, and other sources (such as portals) in real time, supporting the creation of rules and then automatically making policy decisions for each subscriber active on the network. The Policy and Charging Rules Function (PCRF) 126 may communicate with a billing component 128.

The Customer Relationship Management (CRM) 130 may be an integrated management information system that is used to schedule, plan, and control the activities for the wireless network 106. The Customer Relationship Management (CRM) 130 may include hardware, software, and networking tools to improve customer tracking and communication.

In some aspects, the wireless network 106 may include an S8 interface. The S8 interface may provide an inter-PLMN reference point providing user and control plane between the Serving GW in the VPLMN 132 and the public data network (PDN) gateway (GW) 112 and the home Public Land Mobile Network (PLMN) 120. S8 is the inter PLMN variant of S5. In some aspects, the wireless network 106 may include Gx signaling. The Gx signaling may provide an on-line policy interface between the GGSN and the charging rules function (CRF). It may be used for provisioning service data flow based on charging rules. The Gx signaling may utilize the diameter protocol. In some aspects, the wireless network 106 may include Gy signaling. The Gy signaling may be an on-line charging interface between the GGSN and the Online Charging System (OCS) 124. The Gy signaling may utilize the diameter protocol.

In some aspects, the plurality of wireless networks 106 may include a Mobile services Switching Center (MSC) that may perform the switching of calls and that may include a Visitor Location Register (VLR). The plurality of wireless networks 106 may also include a Base Transceiver Station (BTS) and a Base Station Controller (BSC). The base transceiver station houses the radio transceivers that define a cell and handle the radio-link protocols with the at least one device 104. The base station controller manages the radio resources for one or more base transceiver stations. The base station controller is the connection between the at least one device 104 and the Mobile service Switching Center (MSC).

A Home Location Register (HLR) and the VLR together with the MSC, provide the call-routing and roaming capabilities. The HLR contains all the administrative information of each subscriber registered in the plurality of wireless networks 106, along with the current location of the at least one device 104. The above is an exemplary implementation of the plurality of wireless networks 106. Other types of networks utilizing other types of protocols may be implemented as well and are contemplated by the disclosure.

Referring to FIG. 9, the cloud service 100 may include, may implement, may connect, and/or the like an IoT platform. In a particular aspect, all data exchanged between the at least one device 104 and the third-party enterprise 102 may be monitored by the cloud service 100. In a particular aspect, all data exchanged between the at least one device 104 and the third-party enterprise 102 may be transmitted through the cloud service 100.

Accordingly, the disclosure provides companies the ability to control functionality and/or limit functionality of mobile devices and/or wireless services to increase efficiency and productivity, reduce costs, and/or reduce potential hazards. This ability is especially unique with mobile devices as they operate outside the company's network. The typical company has great control over their own network resources. Hence, the unique approach to the network securing scheme disclosed allows a company to maintain greater control of devices of the company provided wireless service which would have previously been impossible to implement.

For the purposes of this disclosure a computer readable medium stores computer data, which data can include computer program code that is executable by a processor of the SIM or mobile device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, 4G ($4^{th}$ generation mobile networks or $4^{th}$ generation wireless systems), Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system, or the like.

Further in accordance with various aspects of the disclosure, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation to encompass all such modifications and similar structures. The present disclosure includes any and all aspects of the following claims.

Accordingly, the disclosure has set forth a cloud service 100 that provides increased efficiency, connectivity, control, proficiency, and the like. The cloud service 100 ensures that the third-party enterprise 102 has an improved and more reliable experience as it relates to the various implementations of the at least one device 104. Moreover, the disclosure has set forth a cloud service 100 that provides increased efficiency, connectivity, control, proficiency, and the like with respect to multiple wireless carriers and/or multiple wireless networks 106. The cloud service 100 ensures that the third-party enterprise 102 has an improved and more reliable experience as it relates to various implementation of the at least one device 104 with respect to multiple wireless carriers and/or multiple wireless networks 106.

The following are a number of nonlimiting Examples of aspects of the disclosure.

One example includes a process of securing a wireless service provided to at least one wireless device from a wireless network, the process includes: implementing a secure network server in at least one of a network operator cloud and a mobile network operator implementing the wireless network; implementing at least one of the following: a unique Access Point Name (APN), an International Mobile Equipment Identity (IMEI) whitelist, a virtual private network (VPN) over encrypted network, a dedicated firewall, a white list of IP addresses, and a unique SIM; receiving identification of at least one wireless device in the secure network server from an administrator; receiving securing instructions from the administrator in the secure network server for the at least one wireless device; receiving a request in the wireless network for an internet resource from at least one wireless device; comparing the request for the internet resource to the securing instructions with the secure network server to determine whether the request for an internet resource is allowed or not allowed based on the securing instructions; providing the internet resource to the wireless device with the secure network server if the request for an internet resource is allowable based on the securing instructions; and denying the internet resource to the wireless device with the secure network server if the request for an internet resource is not allowed based on the securing instructions, where the securing instructions includes at least one of the following: the International Mobile Equipment Identity (IMEI) whitelist and the white list of IP addresses.

The above-noted Example may further include any one or a combination of more than one of the following aspects. The process of securing a wireless service where the securing instructions includes the international mobile equipment identity (IMEI) whitelist and the whitelist of IP addresses, and where the receiving securing instructions from the administrator in the secure network server includes receiving the securing instructions through a webpage generated by the secure network server. The process of securing a wireless service includes implementing the unique access point name (APN), the international mobile equipment identity (IMEI) whitelist, the virtual private network (VPN) over encrypted network, the dedicated firewall, the white list of IP addresses, and the unique sim; the unique access point name (APN) includes at least one of the following: a nonstandard name, a name that is encrypted, and a name that is not publicly accessible; and the virtual private network (VPN) over encrypted network includes at least one of the following: a virtual point-to-point connection through dedicated circuits, a virtual point-to-point connection with tunneling protocols, a remote access configuration, site to site configurations, and extranet based site to site configurations. The process of securing a wireless service includes implementing the unique access point name (APN). The unique access point name (APN) includes at least one of the following: a nonstandard name, a name that is encrypted, and a name that is not publicly accessible. The process of securing a wireless service includes implementing the international mobile equipment identity (IMEI) whitelist. The process of securing a wireless service includes implementing the virtual private network (VPN) over encrypted network. The virtual private network (VPN) over encrypted network includes at least one of the following: a virtual point-to-point connection through dedicated circuits, a virtual point-to-point connection with tunneling protocols, a remote access configuration, site to site configurations, and extranet based site to site configurations. The process of securing a wireless service includes implementing the dedicated firewall. The dedicated firewall is configured to monitor and control incoming and outgoing network traffic. The process of securing a wireless service includes implementing the whitelist of IP addresses. The process of securing a wireless service includes implementing the unique SIM. The at least one wireless device includes at least one internet of things (IoT) device. The at least one wireless device includes at least one device implementing machine to machine (M2M) communication. The receiving identification of the at least one wireless device in the secure network server from the administrator includes receiving company identification information through a webpage generated by the secure network server; and where the secure network server is configured to search a database based on the company identification information to generate the identification of the at least one wireless device utilized by the company. The secure network server is implemented in the wireless network by the mobile network operator; and where the administrator accesses the webpage generated by the secure network server using a thin client. The secure network server is at least partially implemented in part in the network operator cloud; where the secure network server is further configured for provisioning, metering, and consolidating information for the at least one wireless device; and where the implementing the secure network server further includes implementing the secure network server as a software as a service (SaaS) implemented as a software licensing and delivery model licensed on a subscription basis. The network operator cloud includes a mobile virtual network operator cloud. The secure network server is implemented by the mobile network operator in the wireless network; and where the mobile network operator is configured for provisioning, metering, and consolidating information for the at least one wireless device. The secure network server is implemented in the network operator cloud separate from the wireless network; and where the network operator cloud is configured for provisioning, metering, and consolidating information for the at least one wireless device.

One example includes a wireless network system configured to secure a wireless service provided to at least one wireless device from a wireless network, the wireless network system includes: a secure network server implemented in at least one of a network operator cloud and a mobile network operator implementing the wireless network; at least one wireless device configured to implement at least one of the following: a unique Access Point Name (APN), a virtual private network (VPN) over encrypted network, a dedicated firewall, and a unique SIM; the secure network server configured to implement at least one of the following: a unique Access Point Name (APN), an International Mobile Equipment Identity (IMEI) whitelist, a virtual private network (VPN) over encrypted network, a dedicated firewall, a white list of IP addresses, and a unique SIM; the secure network server configured to receive identification of at least one wireless device in the secure network server from an administrator; the secure network server configured to receive securing instructions from the administrator in the secure network server for the at least one wireless device; the secure network server configured to receive a request in the wireless network for an internet resource from at least one wireless device; the secure network server configured to compare the request for the internet resource to the securing instructions to determine whether the request for an internet resource is allowed or not allowed based on the securing instructions; the secure network server configured to provide the internet resource to the wireless device if the request for an internet resource is allowable based on the securing instructions; and the secure network server configured to deny the internet resource to the wireless device if the request for an internet resource is not allowed based on the securing instructions, where the securing instructions includes at least one of the following: the International Mobile Equipment Identity (IMEI) whitelist and the white list of IP addresses.

The above-noted Example may further include any one or a combination of more than one of the following aspects. The wireless network system where the securing instructions includes the international mobile equipment identity (IMEI) whitelist and the whitelist of IP addresses, and where the securing instructions are received from the administrator in the secure network server through a webpage generated by the secure network server. The at least one wireless device is configured to implement the unique access point name (APN), the virtual private network (VPN) over encrypted network, the dedicated firewall, and the unique SIM; the unique access point name (APN) includes at least one of the following: a nonstandard name, a name that is encrypted, and a name that is not publicly accessible; and the virtual private network (VPN) over encrypted network includes at least one of the following: a virtual point-to-point connection through dedicated circuits, a virtual point-to-point connection with tunneling protocols, a remote access configuration, site to site configurations, and extranet based site to site configurations. The at least one wireless device is configured to implement the unique access point name (APN). The unique access point name (APN) includes at least one of the following: a nonstandard name, a name that is encrypted, and a name that is not publicly accessible. The secure network server is configured to implement the international mobile equipment identity (IMEI) whitelist. The secure network server is configured to implement the virtual private network (VPN) over encrypted network. The virtual private network (VPN) over encrypted network includes at least one of the following: a virtual point-to-point connection through dedicated circuits, a virtual point-to-point connection with tunneling protocols, a remote access configuration, site to site configurations, and extranet based site to site configurations. The at least one wireless device configured to implement the dedicated firewall. The dedicated firewall is configured to monitor and control incoming and outgoing network traffic. The secure network server is configured to implement the whitelist of IP addresses. The secure network server is configured to implement the unique SIM. The at least one wireless device includes at least one internet of things (IoT) device. The at least one wireless device includes at least one device implementing machine to machine (M2M) communication. The secure network server is configured to receive the identification of the at least one wireless device from the administrator that includes receiving company identification information through a webpage generated by the secure network server; and where the secure network server is configured to search a database based on the company identification information to generate the identification of the at least one wireless device utilized by the company. The secure network server is implemented in the wireless network by the mobile network operator; and where the administrator accesses the webpage generated by the secure network server using a thin client. The secure network server is at least partially implemented in part in the network operator cloud; where the secure network server is further configured for provisioning, metering, and consolidating information for the at least one wireless device; and where the secure network server is further configured to implement the secure network server as a software as a service (SaaS) implemented as a software licensing and delivery model licensed on a subscription basis. The network operator cloud includes a mobile virtual network operator cloud. The secure network server is implemented by the mobile network operator in the wireless network; and where the mobile network operator is configured for provisioning, metering, and consolidating information for the at least one wireless device.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

According to an example, the global navigation satellite system (GNSS) may include a device and/or system that may estimate its location based, at least in part, on signals received from space vehicles (SVs). Such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, these techniques may also apply to other types of SPS, and that claimed subject matter is not limited in this respect.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system, or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

The IoT control application 252 and/or the secure network client 298 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The following acronyms used herein will be defined as follows:
BSC—Base Station Controller
BTS—Base Transceiver Station
CDMA—Code-Division Multiple Access
ESN—Electronic Serial Number
GSM—Global System for Mobile communication
HLR—Home Location Register
ICCID—Integrated Circuit Card Identification
International Mobile Equipment Identity (IMEI)—International Mobile Equipment Identity
IMSI—International Mobile Subscriber Identity
LAI—Local Area Identity
LTE—Long Term Evolution
MSC—Mobile services Switching Center
MVNO—Mobile Virtual Network Operator
SMS—Short Message Service
UICC—Universal Integrated Circuit Card or SIM
UMTS—Universal Mobile Telecommunications Service
VLR—Visitor Location Register While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation to encompass all such modifications and similar structures. The disclosure includes any and all aspects of the following claims.

The invention claimed is:

1. A process of securing a wireless service provided to at least one wireless device from a wireless network, the process comprising:
implementing a secure network server in at least one of a network operator cloud and a mobile network operator implementing the wireless network;
implementing at least one of the following: a unique Access Point Name (APN), an International Mobile Equipment Identity (IMEI) whitelist, a virtual private network (VPN) over encrypted network, a dedicated firewall, a whitelist of IP addresses, and a unique SIM;
receiving identification of at least one wireless device in the secure network server from an administrator;
receiving securing instructions from the administrator in the secure network server for the at least one wireless device;
receiving a request in the wireless network for an internet resource from at least one wireless device;
comparing the request for the internet resource to the securing instructions with the secure network server to determine whether the request for an internet resource is allowed or not allowed based on the securing instructions;
providing the internet resource to the wireless device with the secure network server if the request for an internet resource is allowable based on the securing instructions;
denying the internet resource to the wireless device with the secure network server if the request for an internet resource is not allowed based on the securing instructions; and
implementing the unique Access Point Name (APN), the International Mobile Equipment Identity (IMEI) whitelist, the virtual private network (VPN) over encrypted network, the dedicated firewall, the whitelist of IP addresses, and the unique SIM,
wherein the securing instructions comprise at least one of the following: the International Mobile Equipment Identity (IMEI) whitelist and the whitelist of IP addresses.

2. The process of securing a wireless service according to claim 1
wherein the securing instructions comprise the International Mobile Equipment Identity (IMEI) whitelist and the whitelist of IP addresses; and
wherein the receiving securing instructions from the administrator in the secure network server comprises receiving the securing instructions through a webpage generated by the secure network server.

3. The process of securing a wireless service according to claim 1, wherein:
the unique Access Point Name (APN) comprises at least one of the following: a nonstandard name, a name that is encrypted, and a name that is not publicly accessible; and
the virtual private network (VPN) over encrypted network comprises at least one of the following: a virtual point-to-point connection through dedicated circuits, a virtual point-to-point connection with tunneling protocols, a remote access configuration, site to site configurations, and extranet based site to site configurations.

4. The process of securing a wireless service according to claim 1, further comprising implementing the International Mobile Equipment Identity (IMEI) whitelist.

5. The process of securing a wireless service according to claim 1, further comprising implementing the virtual private network (VPN) over encrypted network.

6. The process of securing a wireless service according to claim 5, wherein the virtual private network (VPN) over encrypted network comprises at least one of the following: a virtual point-to-point connection through dedicated circuits, a virtual point-to-point connection with tunneling protocols, a remote access configuration, site to site configurations, and extranet based site to site configurations.

7. The process of securing a wireless service according to claim 1, wherein the receiving identification of the at least one wireless device in the secure network server from the administrator comprises receiving company identification information through a webpage generated by the secure network server; and wherein the secure network server is configured to search a database based on the company identification information to generate the identification of the at least one wireless device utilized by the company.

8. The process of securing a wireless service according to claim 1, wherein:

the secure network server is implemented by the mobile network operator in the wireless network, wherein the mobile network operator is configured for provisioning, metering, and consolidating information for the at least one wireless device; or the secure network server is implemented in the network operator cloud separate from the wireless network, wherein the mobile network operator is configured for provisioning, metering, and consolidating information for the at least one wireless device.

9. A wireless network system configured to secure a wireless service provided to at least one wireless device from a wireless network, the wireless network system comprising:

a secure network server implemented in at least one of a network operator cloud and a mobile network operator implementing the wireless network;

at least one wireless device configured to implement at least one of the following: a unique Access Point Name (APN), a virtual private network (VPN) over encrypted network, a dedicated firewall, and a unique SIM;

the secure network server configured to implement at least one of the following: a unique Access Point Name (APN), an International Mobile Equipment Identity (IMEI) whitelist, a virtual private network (VPN) over encrypted network, a dedicated firewall, a whitelist of IP addresses, and a unique SIM;

the secure network server configured to receive identification of at least one wireless device in the secure network server from an administrator;

the secure network server configured to receive securing instructions from the administrator in the secure network server for the at least one wireless device;

the secure network server configured to receive a request in the wireless network for an internet resource from at least one wireless device;

the secure network server configured to compare the request for the internet resource to the securing instructions to determine whether the request for an internet resource is allowed or not allowed based on the securing instructions;

the secure network server configured to provide the internet resource to the wireless device if the request for an internet resource is allowable based on the securing instructions; and the secure network server configured to deny the internet resource to the wireless device if the request for an internet resource is not allowed based on the securing instructions, wherein the securing instructions comprise at least one of the following: the International Mobile Equipment Identity (IMEI) whitelist and the whitelist of IP addresses; and wherein the at least one wireless device is configured to implement the unique Access Point Name (APN), the virtual private network (VPN) over encrypted network, the dedicated firewall, and the unique SIM.

10. The wireless network system according to claim 9 wherein the securing instructions comprise the International Mobile Equipment Identity (IMEI) whitelist and the whitelist of IP addresses; and wherein the securing instructions are received from the administrator in the secure network server through a webpage generated by the secure network server.

11. The wireless network system according to claim 9, wherein:

the unique Access Point Name (APN) comprises at least one of the following: a nonstandard name, a name that is encrypted, and a name that is not publicly accessible; and the virtual private network (VPN) over encrypted network comprises at least one of the following: a virtual point-to-point connection through dedicated circuits, a virtual point-to-point connection with tunneling protocols, a remote access configuration, site to site configurations, and extranet based site to site configurations.

12. The wireless network system according to claim 9, wherein the secure network server is configured to implement the International Mobile Equipment Identity (IMEI) whitelist.

13. The wireless network system according to claim 9, wherein the secure network server is configured to implement the virtual private network (VPN) over encrypted network.

14. The wireless network system according to claim 13, wherein the virtual private network (VPN) over encrypted network comprises at least one of the following: a virtual point-to-point connection through dedicated circuits, a virtual point-to-point connection with tunneling protocols, a remote access configuration, site to site configurations, and extranet based site to site configurations.

15. The wireless network system according to claim 9, wherein the secure network server is configured to receive the identification of the at least one wireless device from the administrator that comprises receiving company identification information through a webpage generated by the secure network server; and wherein the secure network server is configured to search a database based on the company identification information to generate the identification of the at least one wireless device utilized by the company.

16. The wireless network system according to claim 9, wherein:

the secure network server is implemented by the mobile network operator in the wireless network, wherein the mobile network operator is configured for provisioning, metering, and consolidating information for the at least one wireless device; or the secure network server is implemented in the network operator cloud separate from the wireless network, wherein the mobile network operator is configured for provisioning, metering, and consolidating information for the at least one wireless device.

17. A non-transitory computer program product embodying instructions to execute a method of securing a wireless service provided to at least one wireless device from a wireless network, the non-transitory computer program product being executed on at least one processor and having instructions comprising:

implementing a secure network server in at least one of a network operator cloud and a mobile network operator implementing the wireless network;

implementing at least one of the following: a unique Access Point Name (APN), an International Mobile Equipment Identity (IMEI) whitelist, a virtual private network (VPN) over encrypted network, a dedicated firewall, a whitelist of IP addresses, and a unique SIM;

receiving identification of at least one wireless device in the secure network server from an administrator;

receiving securing instructions from the administrator in the secure network server for the at least one wireless device;

receiving a request in the wireless network for an internet resource from at least one wireless device;

comparing the request for the internet resource to the securing instructions with the secure network server to determine whether the request for an internet resource is allowed or not allowed based on the securing instructions;

providing the internet resource to the wireless device with the secure network server if the request for an internet resource is allowable based on the securing instructions; and denying the internet resource to the wireless device with the secure network server if the request for an internet resource is not allowed based on the securing instructions; and implementing the unique Access Point Name (APN), the International Mobile Equipment Identity (IMEI) whitelist, the virtual private network (VPN) over encrypted network, the dedicated firewall, the whitelist of IP addresses, and the unique SIM, wherein the securing instructions comprise at least one of the following: the International Mobile Equipment Identity (IMEI) whitelist and the whitelist of IP addresses.

18. The non-transitory computer program product of claim 17, wherein the securing instructions comprise the International Mobile Equipment Identity (IMEI) whitelist and the whitelist of IP addresses; and wherein the receiving securing instructions from the administrator in the secure network server comprises receiving the securing instructions through a webpage generated by the secure network server.

\* \* \* \* \*